US009824341B2

(12) United States Patent
DeAddio et al.

(10) Patent No.: US 9,824,341 B2
(45) Date of Patent: Nov. 21, 2017

(54) OBJECT ORIENTED SYSTEM FOR MANAGING COMPLEX FINANCIAL INSTRUMENTS

(71) Applicant: JPMorgan Chase Bank, N.A., New York, NY (US)

(72) Inventors: Michael L. DeAddio, White Plains, NY (US); Axel Kramer, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 32 days.

(21) Appl. No.: 14/249,440

(22) Filed: Apr. 10, 2014

(65) Prior Publication Data

US 2014/0236862 A1     Aug. 21, 2014

Related U.S. Application Data

(63) Continuation of application No. 13/335,101, filed on Dec. 22, 2011, now Pat. No. 8,732,049, which is a
(Continued)

(51) Int. Cl.
*G06Q 40/00*     (2012.01)
*G06Q 20/10*     (2012.01)
(Continued)

(52) U.S. Cl.
CPC ............. *G06Q 20/10* (2013.01); *G06Q 40/00* (2013.01); *G06Q 40/02* (2013.01); *G06Q 40/025* (2013.01);
(Continued)

(58) Field of Classification Search
CPC ........ G06Q 40/00; G06Q 40/20; G06Q 40/04; G06Q 40/025; G06Q 40/06; G06F 9/44; G06F 9/46
(Continued)

(56) References Cited

U.S. PATENT DOCUMENTS 5,301,336 A    4/1994   Kodosky
5,392,382 A    2/1995   Schoppers
(Continued)

FOREIGN PATENT DOCUMENTS

WO     WO 94/20912      9/1994  ............ G06F 15/30
WO     WO 9420912    *   9/1994
(Continued)

OTHER PUBLICATIONS

Kapital Object Model, J.P. Morgan, Copyright 1993.*
(Continued)

*Primary Examiner* — Daniel Felten
(74) *Attorney, Agent, or Firm* — Goodwin Procter LLP

(57) ABSTRACT

Object oriented design strategies and patterns are applied to financial data processing systems for processing and modeling of financial products (also referred to as financial instruments) with an emphasis being on derivative products. The system employs valuation independent, well-defined financial components (also referred to as financial events) that can be combined to build new financial structures. A general purpose software model is provided for representing the structure and characteristics of these products. A declarative specification language is provided to describe financial instruments in a consistent manner that lends itself to processing in such an object oriented system. A general traversal process is provided that can be applied to the macro structure of a financial instrument to implement various functions that produce results based on such information, such as the stream of financial events associated with the instrument, or the pricing or valuation of the instrument. Techniques including double dispatch and other mechanisms are further provided to provide flexible means of associating the appropriate processing methods with the
(Continued)

diverse range of instrument characteristics that are encountered in a typical financial institution's course of business.

21 Claims, 14 Drawing Sheets

Related U.S. Application Data continuation of application No. 12/638,195, filed on Dec. 15, 2009, now Pat. No. 8,099,347, which is a continuation of application No. 09/127,341, filed on Jul. 31, 1998, now Pat. No. 7,801,782.

(51) Int. Cl.
*G06Q 40/02* (2012.01)
*G06Q 40/04* (2012.01)
*G06Q 40/06* (2012.01)
*G06F 9/44* (2006.01)
*G06F 9/46* (2006.01)

(52) U.S. Cl.
CPC ............ *G06Q 40/04* (2013.01); *G06Q 40/06* (2013.01); *G06F 9/44* (2013.01); *G06F 9/46* (2013.01)

(58) Field of Classification Search
USPC .................................. 705/35, 36 R, 38, 10
See application file for complete search history.

(56) References Cited

U.S. PATENT DOCUMENTS

| | | | |
|---|---|---|---|
| 5,446,885 A | 8/1995 | Moore | |
| 5,522,077 A | 5/1996 | Cuthbert | |
| 5,542,078 A | 7/1996 | Martel | |
| 5,631,984 A | 5/1997 | Graf | |
| 5,675,746 A | 10/1997 | Marshall | |
| 5,692,233 A | 11/1997 | Garman | 705/36 |
| 5,826,268 A | 10/1998 | Schaefer | |
| 5,909,681 A | 6/1999 | Passera | |
| 5,937,402 A | 8/1999 | Pandit | |
| 5,987,127 A | 11/1999 | Ikenoue | |
| 5,987,247 A | 11/1999 | Lau | 395/702 |
| 6,023,578 A | 2/2000 | Birsan et al. | 395/702 |
| 6,101,502 A | 8/2000 | Heubner | |
| 6,278,981 B1 | 8/2001 | Dembo et al. | |
| 7,739,180 B2 | 6/2010 | Beverly et al. | |
| 7,761,368 B2 | 7/2010 | May | |
| 7,970,681 B1 | 6/2011 | Bridges et al. | |
| 8,005,806 B2 | 8/2011 | Rupp et al. | |
| 8,056,007 B2 | 11/2011 | Rupp et al. | |
| 8,073,760 B2 | 12/2011 | Gershon et al. | |
| 8,185,524 B2 | 5/2012 | Ho et al. | |
| 8,200,559 B1 | 6/2012 | Wang | |
| 8,285,627 B2 | 10/2012 | Noel | |
| 8,374,951 B2 | 2/2013 | Arnott et al. | |
| 2002/0002530 A1 | 1/2002 | May | |
| 2004/0148240 A1 | 7/2004 | Beverly et al. | |
| 2007/0165625 A1 | 7/2007 | Eisner | |
| 2007/0168301 A1 | 7/2007 | Eisner | |
| 2007/0171923 A1 | 7/2007 | Eisner | |
| 2007/0171924 A1 | 7/2007 | Eisner | |
| 2007/0180150 A1 | 8/2007 | Eisner | |
| 2007/0198437 A1 | 8/2007 | Eisner | |
| 2007/0282733 A1 | 12/2007 | May | |
| 2007/0288254 A1 | 12/2007 | Eisner | |
| 2008/0294978 A1 | 11/2008 | Klintsov | |
| 2009/0292649 A1 | 11/2009 | Gershon et al. | |
| 2010/0250464 A1 | 9/2010 | Gulati et al. | |
| 2012/0041895 A1 | 2/2012 | Gershon et al. | |
| 2012/0296802 A1 | 11/2012 | Rio | |

FOREIGN PATENT DOCUMENTS

| | | |
|---|---|---|
| WO | WO9420912 A1 | 9/1994 |
| WO | WO9532463 A1 | 11/1995 |
| WO | WO9532463 A1 | 11/1995 |
| WO | WO9610232 A1 | 4/1996 |
| WO | WO9610232 A1 | 4/1996 |
| WO | WO9917232 A1 | 4/1999 |
| WO | WO9917232 A1 | 4/1999 |
| WO | WO2007064876 A2 | 6/2007 |
| WO | WO2007064876 A2 | 6/2007 |
| WO | WO2007064877 A2 | 6/2007 |
| WO | WO2007064877 A2 | 6/2007 |
| WO | WO2007064878 A2 | 6/2007 |
| WO | WO2007064878 A2 | 6/2007 |
| WO | WO2007064879 A2 | 6/2007 |
| WO | WO2007064879 A2 | 6/2007 |
| WO | WO2007064880 A2 | 6/2007 |
| WO | WO2007064880 A2 | 6/2007 |
| WO | WO2007064880 A3 | 10/2007 |
| WO | WO2007064880 A3 | 10/2007 |
| WO | WO2007064876 A3 | 11/2007 |
| WO | WO2007064876 A3 | 11/2007 |
| WO | WO2007064877 A3 | 11/2007 |
| WO | WO2007064877 A3 | 11/2007 |
| WO | WO2007064878 A3 | 11/2007 |
| WO | WO2007064878 A3 | 11/2007 |
| WO | WO2007134008 A2 | 11/2007 |
| WO | WO2007134008 A2 | 11/2007 |
| WO | WO2008048304 A2 | 4/2008 |
| WO | WO2008048304 A2 | 4/2008 |
| WO | WO2008048304 A3 | 9/2008 |
| WO | WO2008048304 A3 | 9/2008 |
| WO | WO2007134008 A3 | 10/2008 |
| WO | WO2007134008 A3 | 10/2008 |
| WO | WO2008141673 A1 | 11/2008 |
| WO | WO2008141673 A1 | 11/2008 |
| WO | WO2007064879 A3 | 4/2009 |
| WO | WO2007064879 A3 | 4/2009 |

OTHER PUBLICATIONS

Morgan Guarantee Trust Company of New York, "Kapital Object Model," unpublished paper dated Dec. 20, 1993 (U.S.A.).

Castagna, G., Covariance and Contravariance: Conflict without a Cause,; ACM Transactions on Programming Languages and Systems (TOPLAS) vol. 17, No. 3 (May 1995).

H. Franke, Model-Integrated Programming, not known if published; date unknown.

E. Gamma et al., Design Patterns, Visitor, pp. 331-345, 1995, Addison-Wesley, USA.

W. Waite et al., Software Synthesis via Domain-Specific Software Architecture, University of Colorado at Boulder Technical Report CU-CS-611-92, Sep. 1992.

W. Pitt, The visitor Pattern and a Java Grep Utility, Dr. Dobb's Journal, No. 286, Jun. 1998, Miller Freeman, USA.

A. Goldberg et al., Smalltalk-80, The Language and its Implementation, Numerical Classes, pp. 117-130, 1983, Addison-Wesley, USA.

A. Kramer, Translucent Patches, Journal of Visual Language and Computing, vol. 7, No. 1, pp. 57-77, 1996 USA.

Dr. Perry, UHDL, Third Edition, Introduction to VHDL, pp. 1-16, 1998, McGraw-Hill, USA (Second edition, 1994 no longer available).

Ross M. Miller, "An Intelligent Approach to Financial Valuation," IEEE, 1991, p. 226-231.

Martin Gfeller, "A Risk Management Prototype using object-oriented APL," Proceedings of the International Conference on APL, Sep. 1994, p. 57-67.

Michael Benaroch et al., "An Intelligent Assistant for Financial Hedging," IEEE, 1991, p. 168-174.

Karen Spinner, "Hedging credit, market risk," Wall Street & Technology, Spring 1998, p. 23-25.

Richard Pawson et al., "The Case for Expressive Systems," Sloan Management Review, Winter 1995, p. 41-48.

(56) References Cited

OTHER PUBLICATIONS

"Odyssey: J.P. Morgan's vision of derivative transactions," Wall Street & Technology, Jul. 1998, p. 16.
Andy Webb, "Financial CAD's plug and play platform," Wall Street & Technology, Oct. 1997, p. 76-82.
Carrier R. Smith, "Grasping objects: Get ready for the upheaval," Wall Street & Technology, Dec. 1993, p. 24.
Ron Even et al., "CAFE: A Complex Adaptive Financial Environment," Proceedings of the IEEE/IAFE 1996 Conference on Computational Intelligence for Financial Engineering, Mar. 1996, p. 20-25.
Thomas Eggenschwiller et al., "ET++ SwapsManager: Using Object Technology in the Financial Engineering Domain," Conference Proceedings on Object-oriented Programming Systems, Languages, and Applications, Oct. 1992, . 166-177.
Michael Duell et al., "Non-software examples of software design patterns," Conference on Object Oriented Programming Systems Languages and Applications, Oct. 1997, p. 120-124.
W. David Pitt, "The Visitor Pattern and a Java Grep Utility," Dr. Dobb's Journal, Jun. 1998, p. 30-32.
David Gould, "Double Dispatch with an Inverted Visitor Pattern," C/C++ Users Journal, May 1998, p. 67-74.
Richard Rasala, "A Model C++ Iterator Class for binary search trees," Technical Symposium on Computer Science Education, Mar. 1997, p. 72-76.
Jones et al., "Composing Contracts: An Adventure in Financial Engineering," Functional Pearl, International Conference on Functional Programming, Aug. 17, 2000, Montreal.
Lexifi Sas, "Structuring, Pricing and Processing: Complex Financial Products with MLFI," White Paper, Aug. 2003.
Jones et al., Composing Contracts: An Adventure in Financial Engineering: Functional Pearl, International Conference on Functional Programming Aug. 17, 2000, Montreal.
LEXIFI SAS, Structuring, Pricing, and Processing: Complex Financial Products with MLFI, White Paper, Aug. 2003.
Castagna, G. "Covariance and Contravariance: Conflict without a Cause"; ACM Transactions on Programming Languages and Systems (TOPLAS) vol. 17, No. 3 (May 1995).
Morgan Guarantee Trust Company of New York, "Kapital Object Model", unpublished paper dated Dec. 20, 1993 (USA).
Ross M. Miller, "An Intelligent Approach to Financial Valuation", IEEE, 1991, p. 226-231.
Martin Gfeller, "A Risk Management Prototype using object-oriented APL", Proceedings of the International Conference on APL, Sep. 1994, p. 57-67.
Michel Benaroch et al., "An Intellligent Assistant for Financial Hedging", IEEE, 1991, p. 168-174.
Karen Spinner, "Hedging credit, market risk", Wall Street & Technology, Spring 1998, p. 23-25.
Ron Even et al. "CAFÉ: A Complex Adaptive Fiancial Environment", Proceedings of the IEEE/IAFE 1996 Conference on Computational Intelligence for Financial Engineering, Mar. 1996, p. 20-25.
Thomas Eggenschwiler et al, "ET++ SwapsManager: Using Object Technology in the Financial Engineering Domain", Conference Proceedings on Object-oriented Programming Systems, Languages, and Applications, Oct. 1992, p. 166-177.
Michael Duell et al, "Non-software examples of software design patterns", Conference on Object Oriented Programming Systems Languages and Applications, Oct. 1997, p. 120-124.
W. David Pitt, "The Visitor Pattern and a Java Grep Utility", Dr. Dobb's Journal, Jun. 1998, p. 30-32.
David Gould, "Double Dispatch with an Inverted Visitor Pattern", C/C++ Users Journal, May 1998, p. 67-74.
Richard Rasala, "A Model C++ Iterator Class for binary search trees", Technical Symposium on Computer Science Education, Mar. 1997, p. 72-76.
A. Goldberg, et al., Smalltalk-80, The Language and its Implementation, Numerical Classes, pp. 117-130, 1983, Addison-Wesley, USA.

\* cited by examiner

Payment Component

Micro Structure Definition:

*Internal Instance Variables*
date:       Simple Date
currency:   Simple Symbol
notional:   Simple Float
accrual:    Accrual Interface

---

Interface Definitions:

1) Accrual Interface supports:
   - start date
   - end date
   - rate
   - day count
   - processing interface 2) Processing Interface (required)
   - valueEventInProcessor:

Figure 2 - Micro Structure of a Payment Component

Figure 4 - Sample Financial Instrument Structure: Equity Option

Figure 5 - Financial Instrument Structure Relationships

Figure 6 - Alternative Instrument Parameters Implementations

Figure 7 - Event Stream Representation

Figure 8 – Simple Swap Event Stream

Figure 9 – Simple Option Event Stream Representation

Figure 10 - Example Processing Class Hierarchy

Figure 11 – Methods Implemented on Event and Processing Classes

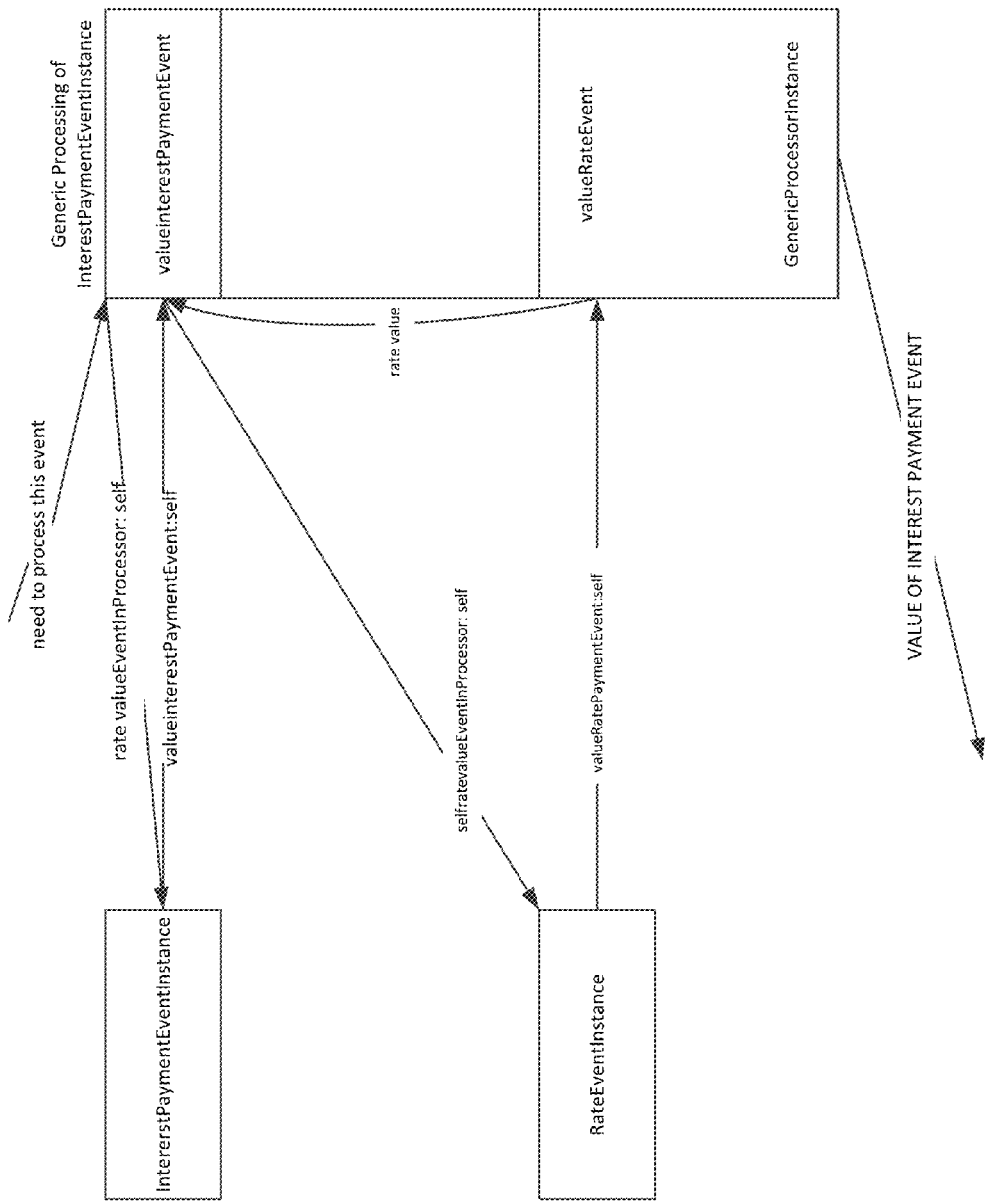
Figure 13 – Nested Double Dispatch

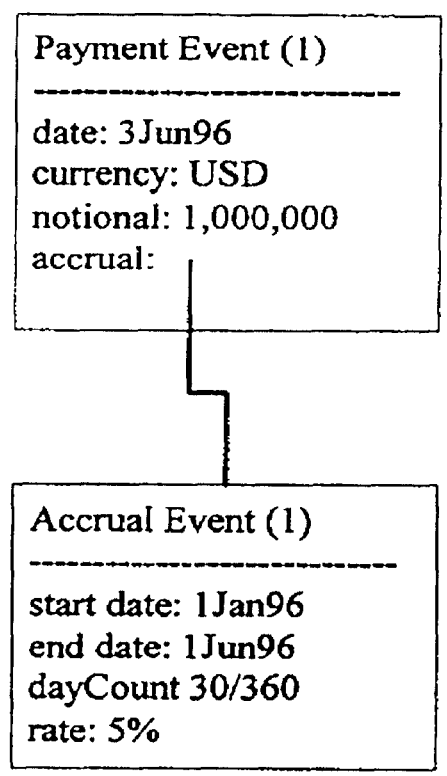
Figure 14 - Single Fixed Rate Payment Event

OBJECT ORIENTED SYSTEM FOR MANAGING COMPLEX FINANCIAL INSTRUMENTS

RELATED APPLICATIONS

This application is a continuation application of U.S. patent application Ser. No. 13/335,101, filed Dec. 22, 2011, which is a continuation application of U.S. patent application Ser. No. 12/638,195, filed Dec. 15, 2009, now U.S. Pat. No. 8,099,347, which is a continuation application of U.S. patent application Ser. No. 09/127,341, filed Jul. 31, 1998, now U.S. Pat. No. 7,801,782, all of which are hereby incorporated in their entirety.

BACKGROUND OF THE INVENTION

Field of the Invention

This invention generally relates to the field of systems for data processing in the financial services industry, and more particularly to systems for managing substantial portfolios of derivatives and other complex financial instruments now widely used in that industry.

Description of the Related Art

There are several major domains of interest in the design and implementation of modern risk management systems. These include:

- modeling of valuation methodologies
- modeling of financial products
- modeling of market environment information
- frameworks for risk analysis
- frameworks for persistence Much thought and effort has been put into the study of valuation/pricing models for the financial services industry. These studies are often of a highly theoretical and academic nature. While the continued development of pricing models is absolutely essential for the evolution of the financial business it does not supply the entire solution.

As a result of our experience in this field, we have concluded that the financial services industry cannot just concentrate on the valuation models alone. In practice, a typical financial institution at any time will have positions in significant numbers of financial instruments, the terms of which may vary significant) from one another, even within a single series of instruments. Se crate and apart from the science of pricing and valuing individual instruments, is the practical problem of managing such a number of dissimilar instruments in a consistent manner. Another issue is adjusting the processing of those instruments in a consistent and coordinated way as the pricing and valuation techniques themselves evolve and change.

The ability of a firm's data processing systems to deal with such a number and variety of instruments is essential in order to support reliable and consistent financial and regulatory reporting, which is a key operating requirement for virtually all firms in this industry. Without such a system, the pricing results for similar instruments may vary inexplicably, portfolio valuations may be unreliable, and implementing new or modified pricing, valuation or processing techniques may require cumbersome instrument-by-instrument adjustments which can become impracticable.

In order to solve such problems, we must study generic computer science methodologies that bring pragmatic systems considerations to light, which may then be applied. In addition to providing a new system architecture, our solution involves a formalized approach to the implementation of pricing and risk management systems, which we believe is also essential to the success of the financial business in this area.

BRIEF SUMMARY OF THE INVENTION

It is an object of the present invention to address the issues of consistency, manageability and modifiability described above by applying object oriented design strategies and patterns to the modeling and processing of financial products (also referred to as financial instruments) with an emphasis on derivative products. It is a further object of the invention to provide means to specify financial instruments in a consistent manner that lends itself to controlled and convenient instrument development and data entry. It is still a further object of the invention to provide a general means of processing financial data that is directed at the macro structure of a financial instrument but may be applied without variance for individual instrument characteristics.

To accomplish these and other objectives of the invention, we have developed a system that employs valuation independent, well-defined financial components (also referred to as financial events) that can be combined to build new financial structures. "Valuation independent" means that financial instruments are modeled independently of their valuation methodologies. A general purpose software model is provided and implemented in this system for representing the structure and characteristics of these products. A declarative specification language is provided to describe financial instruments in a consistent manner that lends itself to processing in such an object oriented system. A general traversal process is provided that can be applied to the macro structure of a financial instrument to implement various functions that produce results based on such information, such as the stream of financial events associated with the instrument, or the pricing or valuation of the instrument. We also provide within this system a framework for processing the resulting structures in a way that supports various valuation methodologies. Techniques including double dispatch and other mechanisms are utilized to provide flexible means of associating the appropriate processing methods with the diverse range of instrument characteristics that are encountered in a typical financial institution's course of business. Such techniques allow developers to quickly and easily incorporate new valuation methodologies into the system as these methodologies become available.

We will describe the basic concepts of these models in a way that is as implementation independent as possible; hence this specification will contain pseudo-code only when necessary to illustrate the concepts in question.

This design has been implemented in Smalltalk and Java and we believe it can be implemented in any other object oriented language. Of course, since each development environment has its own tradeoffs, the implementation of such a complex system in a new development environment will present challenges, but ones we believe to be within the competence of persons reasonably skilled in the art.

The manner in which the foregoing objectives are attained is further shown by the drawings enumerated below, and the accompanying detailed description. It should be apparent therefrom that although the invention has been illustrated with a particular preferred embodiment (and certain variations thereon), its principles could equally well be implemented in other ways without departing from the scope and spirit of the invention.

BRIEF DESCRIPTION OF THE DRAWINGS

FIG. 2 is a diagram showing the micro structure of a financial instrument implemented in accordance with the invention.

FIG. 13 is a block diagram illustrating a sequence of events involved in a nested double dispatch mechanism.

FIG. 14 is a block diagram illustrating a swap payment event corresponding to the instrument that was the subject of FIG. 8.

DETAILED DESCRIPTION OF THE PREFERRED EMBODIMENT

Figure 1:
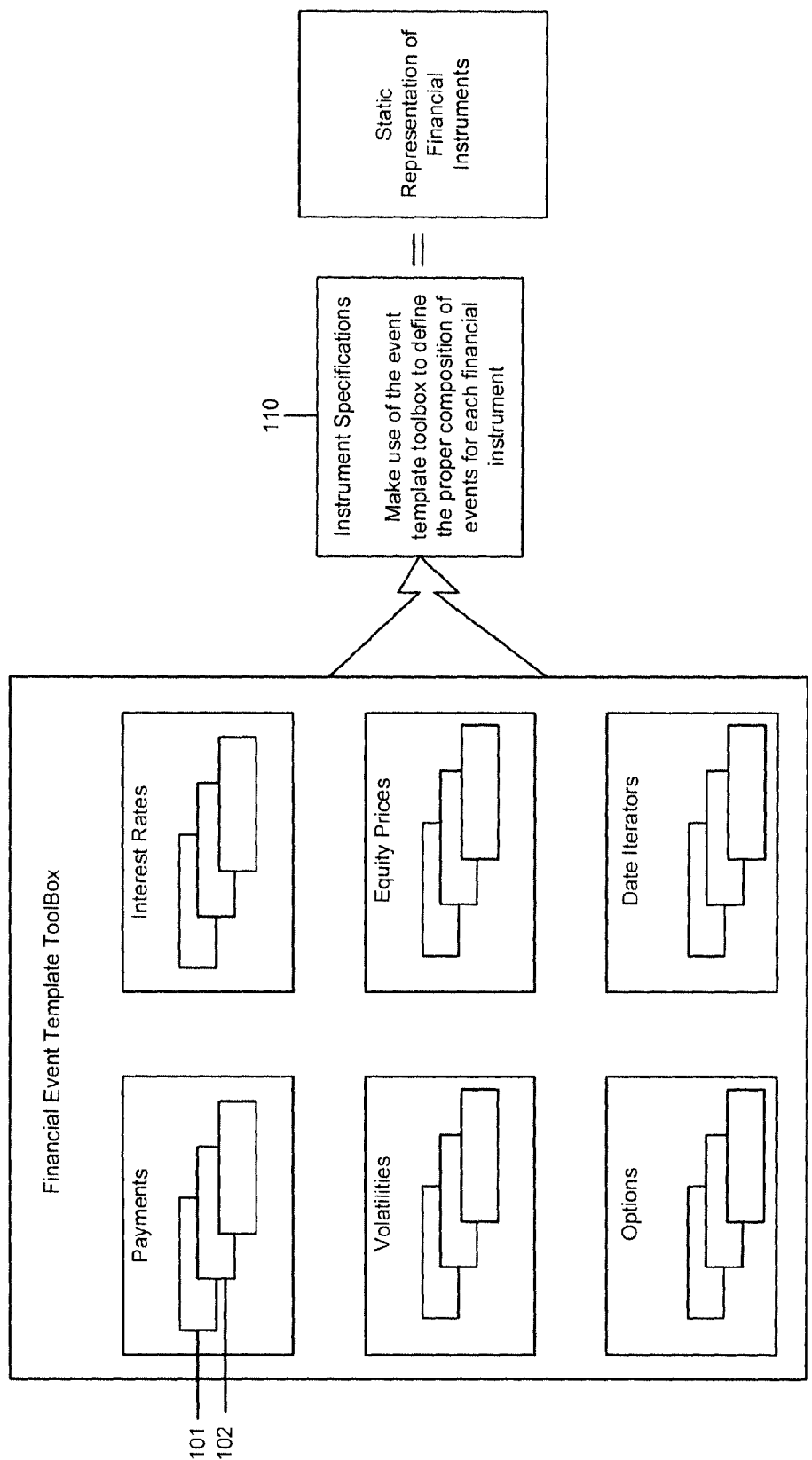
FIG. 1 is a block diagram showing the component design approach implemented in the present invention.

The preferred embodiment of the invention is illustrated in FIGS. 1-14 and Listings 1-16 below and described in the text that follows. The reader should bear in mind, however, that the details of this embodiment (and of the variations thereon that are presented) are not intended to limit the scope of the invention.

It should be noted that all of the systems described in this specification involve the processing of financial data by means including one or more general purpose digital computers and related storage devices, networks, peripherals, systems and development software. Such processing is accomplished by programming such computers in accordance with the methods and techniques set forth herein.

1. THE MAIN CONCEPTS 1.1. Independent Financial Product Modeling

As stated earlier, the essential concept that underlies all of our work in this area is that financial products can and should be modeled independently of their valuation methodologies. We wish to avoid the situation where the software model of a product is dictated by its valuation methodology.

Valuation techniques are in constant flux, evolving and changing at a rapid pace. For proper maintenance of any complex financial system, it is crucial that the product models not be modified when new pricing algorithms arrive. Instead, one should be able to associate new pricing algorithms with pre-existing financial products without affecting the products themselves.

To illustrate this point, consider a simple equity option. A value for this financial product can theoretically be calculated in several different ways. One could use the classic Black & Scholes formula, a probabilistic tree model or even a Monte Carlo simulation. Each methodology calculates the option's value in a different way and hence one would expect slightly different results. However, even though the values differ, the structure and characteristics of the option do not change. It should be possible to use any of these valuation models on the exact same representation of the equity option. To accomplish this we require that the product model and valuation methodologies be independent of one another.

1.2. Financial Component Architecture

Another key concept in this model is a component based approach in which financial instruments are composed of basic financial building blocks. These building blocks are referred to as financial components or financial events.

Here the assumption is made that new financial instruments differ mostly in the way in which they compose and organize these building blocks and only rarely in the building blocks themselves.

Each building block models a very well defined and specific financial concept. Each financial component should be very simple and will:

capture the financial concept it models be re-useable by all developers requiring that type of financial concept One can think of this as a "Lego blocks" approach in which a financial developer has a toolbox of financial building blocks, called "financial event templates" (or sometimes referred to as "financial component templates") that can be utilized to make whatever financial structures are necessary.

1.2.1. Financial Component Micro Structure

As seen in FIG. 1, the toolbox consists of financial component templates, 101, 102, etc. Each financial component can have internal instance variables that point to either simple state information (e.g. numbers and dates) or other components. This means that components can be easily nested to whatever level necessary.

It is important to point out the subtle difference in terminology here between financial events and financial event templates. Templates are used in descriptions as place holders for real events. As will be described later, these descriptions are used to generate real events from the templates.

Each component may have internal variables that point to other components. For each variable that can point to another component an interface must be specified. Any component pointed to by that variable must support the defined interface. The interface must also be "processor independent". This means that it returns results that will not change depending on the kind of processing taking place.

The association of an interface for all internal variables that can contain other components defines the "micro structure" of a component. This is illustrated by the example of a micro structure for a payment component shown in FIG. 2. Note that the processing interface shown in this figure is required of all basic components.

1.2.2. Financial Instrument Macro Structure

Given a set of basic financial components, the next step is to provide a mechanism for specifying how different components fit together to form the model for financial instruments. This is represented in FIG. 1 as the "Instrument Specifications" section 110.

Figure 3:
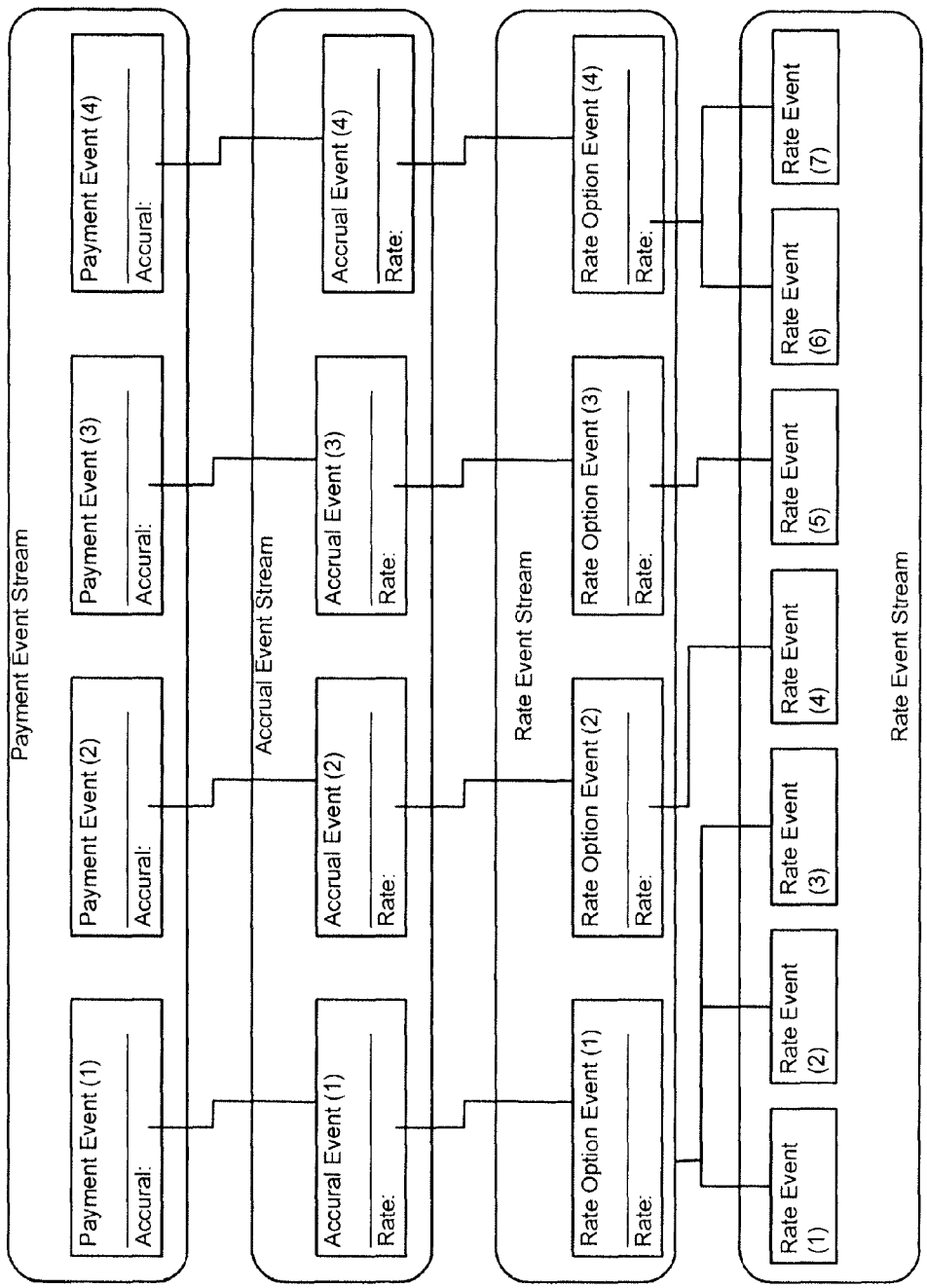
FIG. 3 is a block diagram showing an example of the macro structure of a financial instrument.

The financial instrument specification describes which kind of components an instrument will contain and how they will relate to each other. This is the "macro structure" of a financial instrument. An example of a macro structure is shown in FIG. 3.

The important part of the macro structure is how components are related or nested within each other. The macro structure also defines which actual nested components are used within the confines of the micro structure for each component.

1.3. Standard Mechanism for Defining an Instrument Specification

At this level of detail, the instrument specification is a very generic concept. It simply means that a standardized mechanism has been defined to specify how financial building blocks are to be composed to represent a given financial instrument. This can also be thought of as the description of the macro structure of the instrument.

There are varying ways to implement this concept and this point will be discussed later. Regardless of the implementation, the critical element for this concept to work is that all developers use the same mechanism to define these instrument specifications. This allows any developer to easily read and understand an instrument defined by a fellow developer. This also creates an environment in which financial instrument developers can communicate, interact and share complex ideas with ease.

1.4. Formalized Financial Instrument Structure

Figure 4:
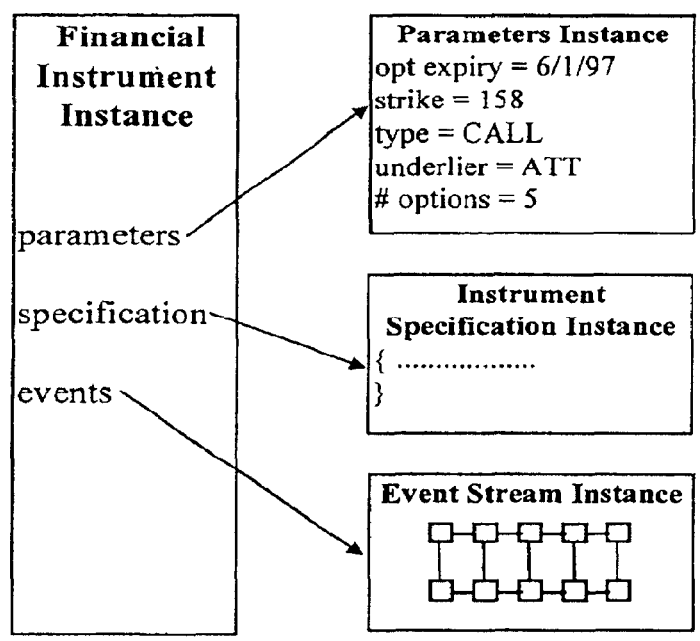
FIG. 4 is a block diagram showing as an example the structure of a simple equity option.

In this model the software structure of any financial instrument is factored into distinct portions. This factoring is done based on underlying financial considerations. Essentially, each product is composed of the following pieces:

instrument parameters—a set of state information
instrument specification—a description of the structure of the financial events
instrument event stream—the financial events resulting from the parameters and specification A financial instrument's object structure is illustrated in FIG. 4. The instrument instance holds onto an instance of each piece of its structure. It is important to recognize that every instrument, regardless of its type or specific details, has this structure. It is the specialization of the internal instances that differentiates one instrument from another.

This factoring allows for a well defined dependency between the different portions of the instrument. We can represent this dependency as follows:

instrument parameters⊕instrument
specification=instrument event stream

The ⊕ operation is obviously not a simple addition operation. It is actually a generic transformation process called event extraction. Event extraction is generic because the exact same process is used for all financial instruments. To generate the events for a new type of instrument one simply has to define the specification and parameters and pass them to the event extraction process. This process always creates exactly the same events for a given combination of instrument specification and instrument parameters. This process has many more ramifications which will be discussed in detail in later sections.

This factoring also allows developers to inherit state and functionality independently for each piece of an instrument.

1.5. Instrument and Event Processing

As stated earlier, processing is independent from the framework for defining financial instruments. The term "processing" is used to cover any and all operations that can be applied to a financial instrument and its events.

The intention of this model is that all processing functionality interfaces with the financial instruments in a well defined and structured way such that its separation from the instrument definition models remains intact.

2. FINANCIAL INSTRUMENT INTERNAL STRUCTURE

As described above, there is a well defined, standard structure for all financial instruments as well as a generic transformation process called event extraction. These pieces of the instrument's structure and their relationships are illustrated in FIG. 5.

Figure 5:
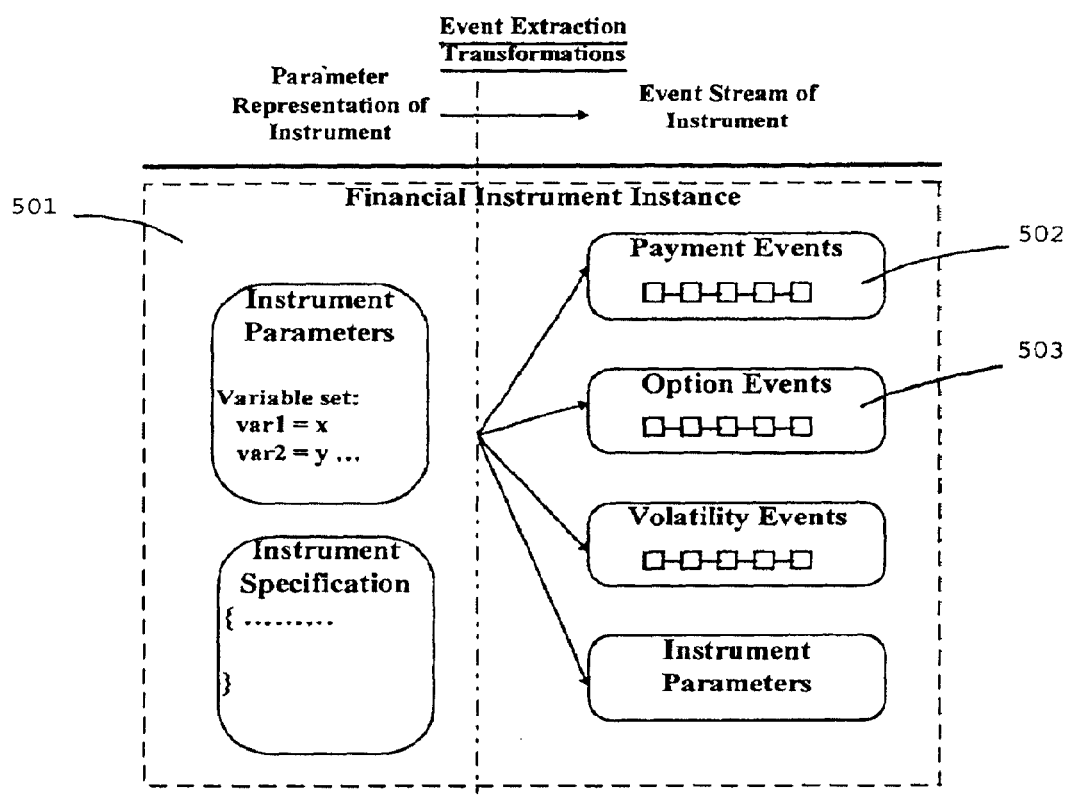
FIG. 5 is a block diagram showing the relationship between the parameter representation of a financial instrument and its event stream representation as generated by an event extraction transformation.

On the left side of FIG. 5 one can see the "static representation" 501 of the instrument. This representation excludes the laid out event streams. On the right side of FIG. 5 one can see some examples of financial event streams 502, 503, etc. that could have been created via the event extraction process, forming a timeline of interrelated event objects that is specific to the given static representation. This is the canonical "event representation" of the instrument.

Since, by definition, the event representation of a financial instrument can always be generated from its static representation, it is not necessary to make the event representation persistent. This allows the implementation to support various persistence models.

2.1. Instrument Parameters

The instrument parameters provide a data storage service, i.e.—a state server, for the particular instrument instance. One can consider instrument parameters as a bag of data which is filled, e.g. like in a spreadsheet. Later this bag of data is associated with a particular instrument. This supports a much more incremental association of data with financial instruments and could be useful in certain work processes.

There is a fixed interface for accessing and setting these parameters. As long as this interface is adhered to, parameter objects can be implemented in arbitrary ways and multiple implementations can coexist in harmony. The benefit of this flexibility is shown in the following example.

Example—Transparent Database Storage Mechanism

Consider the case in which a system is designed to integrate both a high volume "vanilla" financial business as well as a low volume, structured, "exotic" financial business. In most cases, a relational database technology is chosen for the vanilla business because it is characterized by relatively well defined and stable instrument structures. The exotic financial business, on the other hand, is characterized by the rapid development of highly complex instrument structures, therefore object oriented databases can be better suited. It is typically true that an exotics business uses associated vanilla financial products for hedging purposes. Therefore we would like to be able to store the vanilla products in either database technology.

Figure 6:
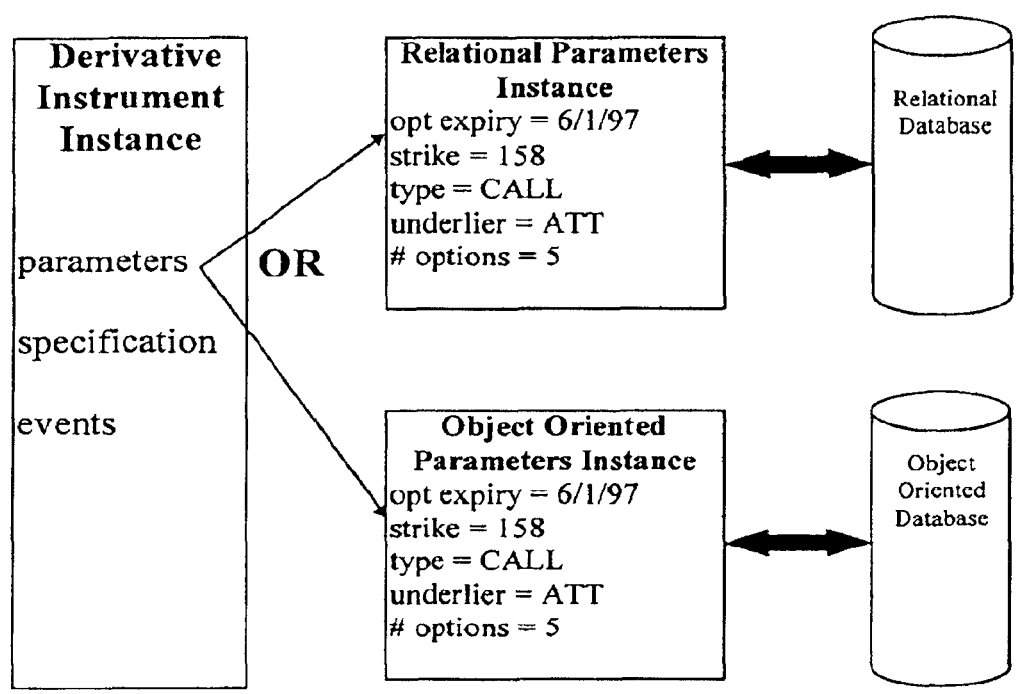
FIG. 6 is a block diagram showing the use of alternative instrument parameter instantiation for purposes of relational or object oriented persistent storage.

This problem can be easily solved with the instrument parameter paradigm. Essentially, there would be two hierarchies of instrument parameter objects; one that could be made persistent in a relational database and one that could be made persistent in an object oriented database. There would be a subclass in each hierarchy specifically for the given vanilla product. Both classes would support the same interface and would also support the same number and names of variables. Therefore, it would be transparent to the rest of the system, and to the financial instrument itself, what kind of database technology was being used. The actual kind of class needed would be determined by the underlying database requirements. It is also possible to switch, "on the fly", between database technologies as the different instances of parameter objects are essentially equivalent. This is illustrated in FIG. 6.

Another important advantage of this mechanism is that the class hierarchy of parameters is independent of the class hierarchy of all the other portions of the instrument. This separates the type of instrument from the state and behavior of the object that represents the parameters.

2.2. Financial Components

Financial components model simple, very narrow portions of real finance business concepts. These components must be reusable and very straightforward to understand and manipulate. When new financial instrument specifications are defined, developers must use pre-existing financial components unless they require a business concept that is not yet implemented. This achieves the composition strategy stated earlier because each business concept will be modeled by one, and only one, software object.

Using one software object to model a business concept allows for a very flexible system environment. Developers can expect the same object, and therefore the same behavior and state information, for a given business object in any financial instrument. Therefore, adding new types of instrument processing functionality can be accomplished quite generically. This concept will be detailed in Section 3 ("Generic Processing Framework") below.

If a development team adheres to this model one can expect the number of financial components for a given financial business environment to level off quickly. Essentially, the total number of business concepts is exhausted quite rapidly and therefore there is no need to develop more financial components. (For example, we found that about 45 basic components are sufficient to model all fixed income derivative instruments at JP Morgan.) Of course, this does not mean that the number of possible financial instruments is limited in any way. Since the instruments are built from organizations of different combinations of the components, the permutations are, in effect, limitless. This organization is formalized via the instrument specification which will be detailed in the Section 2.3 ("Instrument Specification") below.

In general, the most basic business concepts become the base component class for all further specialization. These base classes typically identify and formalize the framework and interface for each business concept. This results in a component object hierarchy that is neatly and clearly divided along business lines. It allows developers to strongly leverage the inheritance tools available in all object oriented environments. The following example illustrates this strategy.

Example—Cash Flow Components

A financial component that is appropriate for just about every kind of financial business is the payment or cashflow event. The cashflow event models the movement of a certain amount of a given currency, in or out on a given date. It must nominally have the following state information:
currency—what type of cash is involved
notional—amount of currency changing hands
payment date—the date on which the transfer occurs This event should be used in all financial instrument specifications that require a simple cashflow to take place. Clearly, however, there are more specialized payment concepts in the financial world. Therefore, the simple cashflow event is also the superclass for all other kinds of financial payments.

Now consider a payment that is based on an interest rate applied over a period of time. This concept is also quite basic and applicable to most financial businesses. The model for this concept would be a subclass of the simple payment event, it would have to add the following state information:
accrual period—fraction of a year over which the interest rate applies This interest rate payment is more specialized than the basic payment class but it could still be used in any event micro structure in which the basic payment interface were required as it supports this interface.

2.3. Instrument Specification

In general, the instrument specification defines or describes how financial components fit together in a logical structure that characterizes a given financial instrument. One aspect of this is the description of the macro structure concept introduced earlier.

The specification for each financial instrument must detail:
which parameters are required
which financial components are to be used and what state they would have
how the components are related to each other; both with respect to time and encapsulation
how the parameters are related to the components There are numerous ways in which to formalize a mechanism that allows developers to define such specifications. Three of the main strategies are discussed below, along with their associated advantages and disadvantages:

2.3.1. Financial Markup Language (FML)

One can consider the instrument specification concept to be a kind of special purpose language, much like Hardware Definition Language (HDL) (a language used for some time by electrical engineers to define how electrical components fit together to compose complex systems) or Extended Markup Language (XML). FML would essentially be a declarative language with well defined, enforceable syntax and usage patterns. Hence, there would actually be two representations of a specification; the textual representation and the objectified representation. The textual representation would be easily readable by humans and the objectified representation would be much like a language parse tree; optimized for efficient execution. The process of transforming the textual representation to the objectified representation would be handled by a parser. We call this the specification extraction process.

This is a programming language independent approach for describing financial instruments. It is different from the programming language in which the event extraction and processing frameworks are implemented.

This approach provides the most control over the specification development environment. Since the language syntax can be easily enforced via the transformation process, the designer of the system has the ability to decide all aspects of the language. Developers cannot wander from the syntax and hence it will remain standardized and easily decipherable by all who are familiar with it. This scheme can also provide self-documenting aspects to the system that can be leveraged for many other purposes.

Another advantage to this approach is that it can provide flexible factoring and reuse of specifications to the developer. It can also clearly describe what parameters are required for a given financial instrument specification.

A drawback to this mechanism is that it can take a significant amount of effort to define and develop a new language description. Secondly, the transformation function provided by the parser also injects some processing overhead into the system because the system must, at some point, convert between the textual and objectified representations.

2.3.2. Programming Language Dependent Specifications

This approach is similar in concept to FML in that there are still textual and objectified representations of financial specifications and that there is a well defined syntax. It is abbreviated in such a way that a truly independent language is not defined. Instead, the objectified representation of specifications are directly created with the same programming language as the underlying system.

The specification syntax is simply a convention built on top of the regular syntax and semantics of the underlying programming language. This reuses the existing compiler or interpreter functionality to transform the textual representation of the specification into the objectified language parse tree.

This approach makes the financial specification language dependent on the underlying programming language and therefore limits flexibility when compared with FML. However, it does require less initial investment in terms of development time and resources and still delivers all the benefits of having a financial specification language.

2.3.3. Algorithmic Event Generation

Instead of using a financial specification language one can generate event streams directly using a standard programming language.

In this case, there would not be an explicit financial specification. Code would be written that, when executed, would create the events and event streams from a set of parameters. Therefore, the code itself would serve as the event extraction process as well as the implicit textual description of the specification. The structure of the code could be influenced by the software framework so that it would look similar and be readable by all developers.

This strategy has the advantage that it requires even less initial investment while still delivering events and event streams that can be processed in the generic framework described later. This strategy may also reduce the processing overhead associated with explicitly converting between the different specification representations.

A major disadvantage is the lack of control of the specification description process. It is critically important that instrument specifications written by different developers be readable and understandable by all. If this is not the case, than the entire premise of the model begins to break down. It is much more difficult, although not impossible, to enforce a coding framework than a well defined language syntax. This is especially true over the long term evolution of a complex system in a high turnover environment.

This approach also limits the factoring and reuse of specifications as well as making it difficult to determine all the required parameters for a given financial instrument.

2.3.4. Summary

We believe that all of the above schemes can be made to be successful in the context of defining financial instruments. It is even feasible that multiple specification implementations can coexist in the same system (for example, to migrate a system from one form of instrument description implementation to another).

However, the divergence of the specification process over the long term needs to be considered very carefully when deciding on an approach. Therefore, we would not recommend the algorithmic approach over the specification approaches.

A true FML implementation would definitely be the most flexible, powerful and interoperable solution. This is very much in accordance with the current textual, domain specific data description standards emerging in the context of XML on the Internet. (Other domain specific textual description languages examples are: Chemical Markup Language (CML), Bioinformatic Sequence Markup Language (BSML), Open Financial Exchange (OFE), Open Trading Protocol (OTP), Synchronized Multimedia Integration Language (SMIL).)

2.4. Instrument Event Stream

Figure 7:
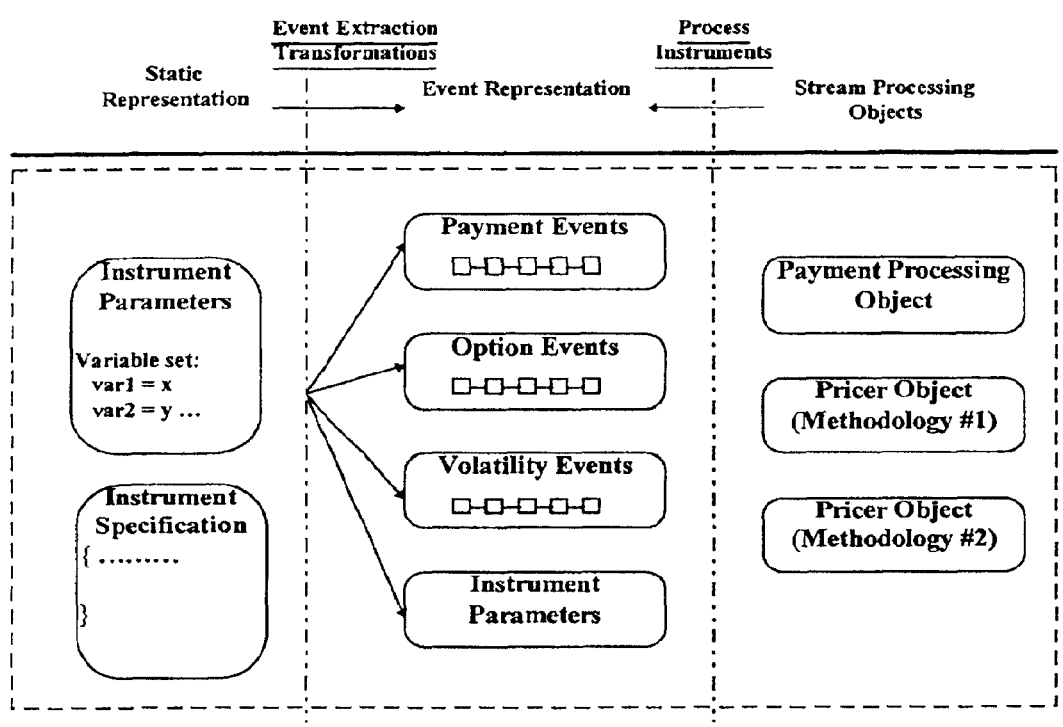
FIG. 7 is a block diagram showing an overall view of the structure and processing of the present invention, including the static and event representation of financial instruments; the event extraction transformation process that generates the event representation from the static representation, and the stream processing objects that act upon the event representation to provide the desired business results and data.

The instrument event stream represents the explicit, financial event structure of a given instance of a financial instrument over time. This can be considered the instantiation of the macro structure of the financial instrument. This structure is completely defined by the instrument specification and the instrument parameters. This is illustrated in FIG. 7.

The event stream representation maintains the full chronological list of all the financial events for the instrument and all of the dependencies between the events. It is typically this representation that provides the information most critical to financial systems.

An important concept to note is that processing objects can only process the instrument in its Event Stream representation. This encapsulates the processing domain from the instrument specification domain. A processor should therefore be able to process an instrument's event stream regardless of the way in which it was specified.

2.5. Sample Instrument Specifications

Here we will show a sample specification for a simple interest rate swap leg instrument and an interest rate option instrument in a declarative, textual manner. The style and syntax are arbitrary and are only intended to illustrate the specification concept. They are not intended to describe a syntax implementation. A real implementation of a declarative specification language would be more complex than this example.

This specification will be broken down into two main sections: the instrument parameters declaration and the financial components structure.

2.5.1. Instrument Parameters

Interest Rate Swap Leg Parameter Description

The following pseudo-code is an example of the parameters declarations for a simple swap:

Listing 1: Swap Leg Instrument Parameters

```
SwapLegInstrumentParameters = (
    var startDate = 1/1/96,
    var endDate = 6/1/97,
    var paymentFrequency = semi-annual,
    var currency = USD,
    var rateIndex = 3MonthLibor,
    var discountOn = LiborCurve,
    var dayCountConvention = 30/360
)
```

The first four of these parameters are self explanatory. The rateindex describes the type of interest rate that the payment is based upon. The discountOn variable describes which interest rate term structure is to be used to discount future cashflows. The dayCountConvention describes how to count the days in the interest accrual period The values assigned to the parameters are default values. It is assumed that these values can be changed to describe the differences between two instances of the same type of instrument.

Interest Rate Option Parameter Description

The following pseudo-code is an example of the parameters declarations for a simple interest rate option stream:

---
Listing 2: Option Instrument Parameters
---
```
OptionInstrumentParameters extends SwapInstrumentParameters (
    var strikeRate = 5%
)
```
---

This instrument parameter declaration inherits from the swap instrument parameters and simply adds and additional parameter, the strike rate variable.

2.5.2. Financial Components Structure and Relationships

Interest Rate Swap Leg Specification

The following pseudo-code is an example of a specification for a single leg of an interest rate swap:

---
Listing 3: Swap Leg Financial Specification
---
```
SwapLegFinancialSpecification = (
IterateDatePeriodFor
(startDate, endDate, paymentFrequency) {
    rate = RateTemplate (
        date = period.start,
        index = rateIndex)
    accrual = YearFractionAccrualTemplate (
        start = period.start,
        end = period.end,
        rate = rate,
        dayCount = dayCountConvention)
    payment = PaymentTemplate (
        payDate = period.end + 2 days,
        currency = currency,
        accrualPeriod = accrualPeriod)
} )
```
---

This specification has two main sections. Firstly, there is a date period iterator that represents a periodic repetition of its contents; in this case based on the start, end and frequency parameters.

Within the scope of the date interval iterator three financial components are defined; a rate event template, an accrual event template and a payment event template. Looking closely we can see how the variables for each instance are obtained from the instrument parameters, the iteration period object or an object created earlier in the process. We can tell from this declarative representation of the specification that each instantiated payment event would point directly to, and therefore contain, an accrual event in its accrual period. The accrual event would point directly to, and therefore contain, the rate event. We also find that the payment date is always 2 days after the end of the accrual period.

The amount of information that we can obtain from a simple perusal of the specification is an example of the power of the declarative approach to specification definition. It becomes quite easy to determine the structure of an instrument without having to instantiate it or debug code.

Interest Rate Option Specification

The following pseudo-code is an example of a specification for a single interest rate option stream:

---
Listing 4: Option Financial Specification
---
```
OptionFinancialSpecification = (
IterateDatePeriodFor
(startDate, endDate, paymentFrequency) {
    rate = RateTemplate (
        date = period.start,
        index = rateIndex)
    optionRate = OptionRateTemplate (
        date = period.start,
        strike = strikeRate,
        rate = rate)
    accrual = YearFractionAccrualTemplate (
        start = period.start,
        end = period.end,
        rate = optionRate,
        dayCount = dayCountConvention)
    payment = PaymentTemplate (
        payDate = period.end + 2 days,
        currency = currency,
        accrualPeriod = accrualPeriod)
} )
```
---

This specification has a similar structure as the interest rate swap leg specification but the rate template has been replace by an OptionRateTemplate that then refers to a RateTemplate. Here the developer is able to reuse the same building blocks for another financial instrument specification. For example, the same YearFractionAccrualTemplate is used with a new type of rate template without any modification. This is allowed because the micro-structure of the accrual event specifies an interface for the rate variable that is supported by both the OptionRateTemplate and RateTemplate objects.

2.6. Event Extraction

As described earlier, the event extraction process implements the ED transformation in the formula below.

instrument parameters⊕instrument specification (objectified)=instrument event stream The event extraction process is a generic transformation that is intended to be applied to any specification that is properly formed. It will essentially walk (i.e.—read) the objectified specification in the context of the given parameters and generate the desired event structure.

One very important rule in the event extraction process is that the event structure is immutable with respect to time. The same process must always generate exactly the same event structure given the same parameter set and instrument specification, regardless of the relative system time. It is the responsibility of the processing object to ignore the events that are not applicable based on any specified date. This significantly simplifies the testing and verification of the event extraction process. The algorithmic event generation option that was described earlier has no explicit event extraction process as the code itself builds the events.

Interest Rate Swap Leg Event Stream

Figure 8:
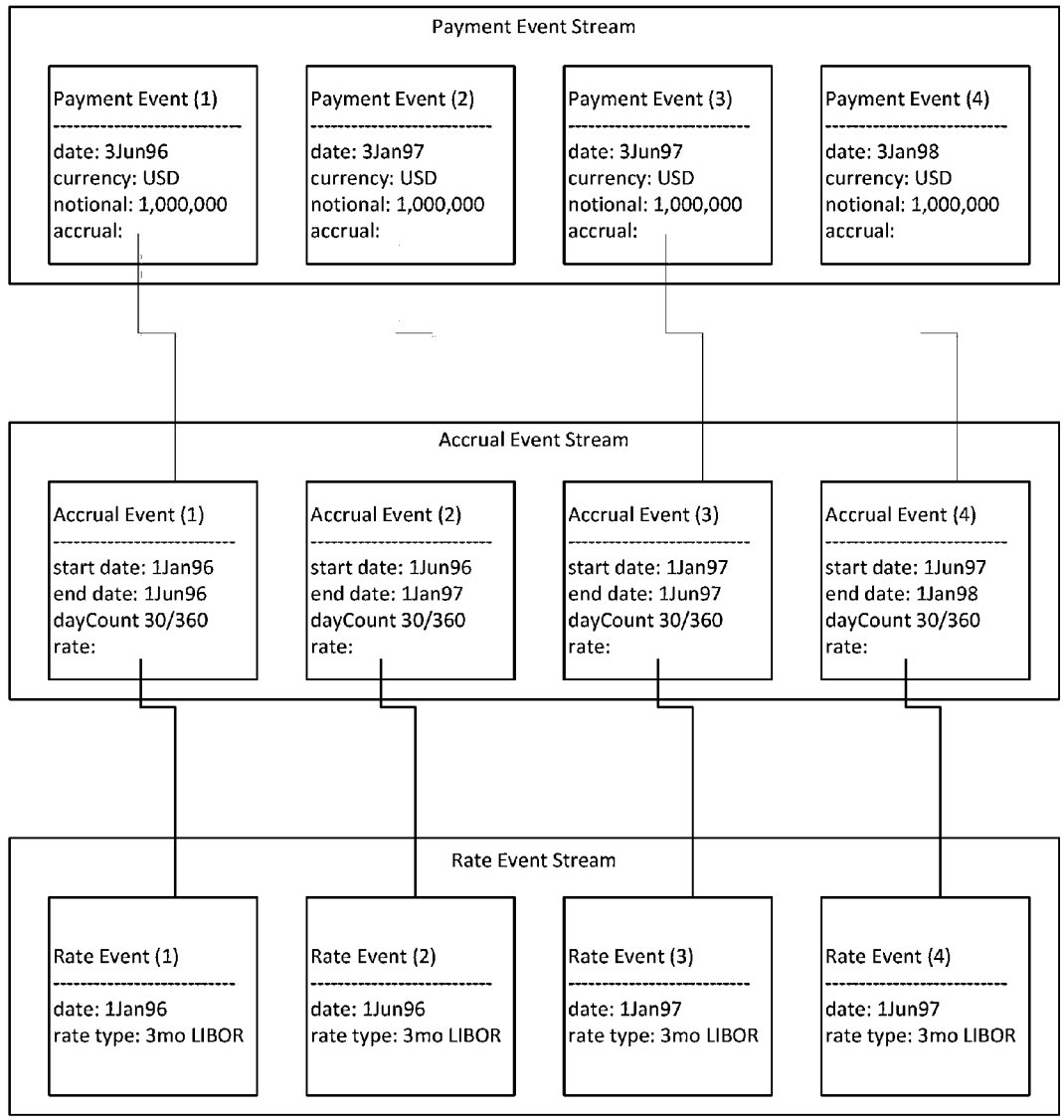
FIG. 8 is a block diagram illustrating the event stream associated with a simple swap instrument.

If the event extraction process were run on the sample interest rate swap leg specification with the given default parameters, the event structure would be as shown in FIG. 8.

During the event extraction process, the processing of the date period iterator will create one instance of each component within its scope. This process also supplies each component with a period object that specifies the date interval of the current iteration. The processing of the iterator essentially functions as the date generation portion of the system.

Note here that in this instrument there is the concept of a top level financial event collection, the interest payments.

From a top level interest payment one can reach all events relevant to that payment. This structural characteristic is particular to this kind of instrument and thus defined in the instrument specification.

Interest Rate Option Event Stream

Figure 9:
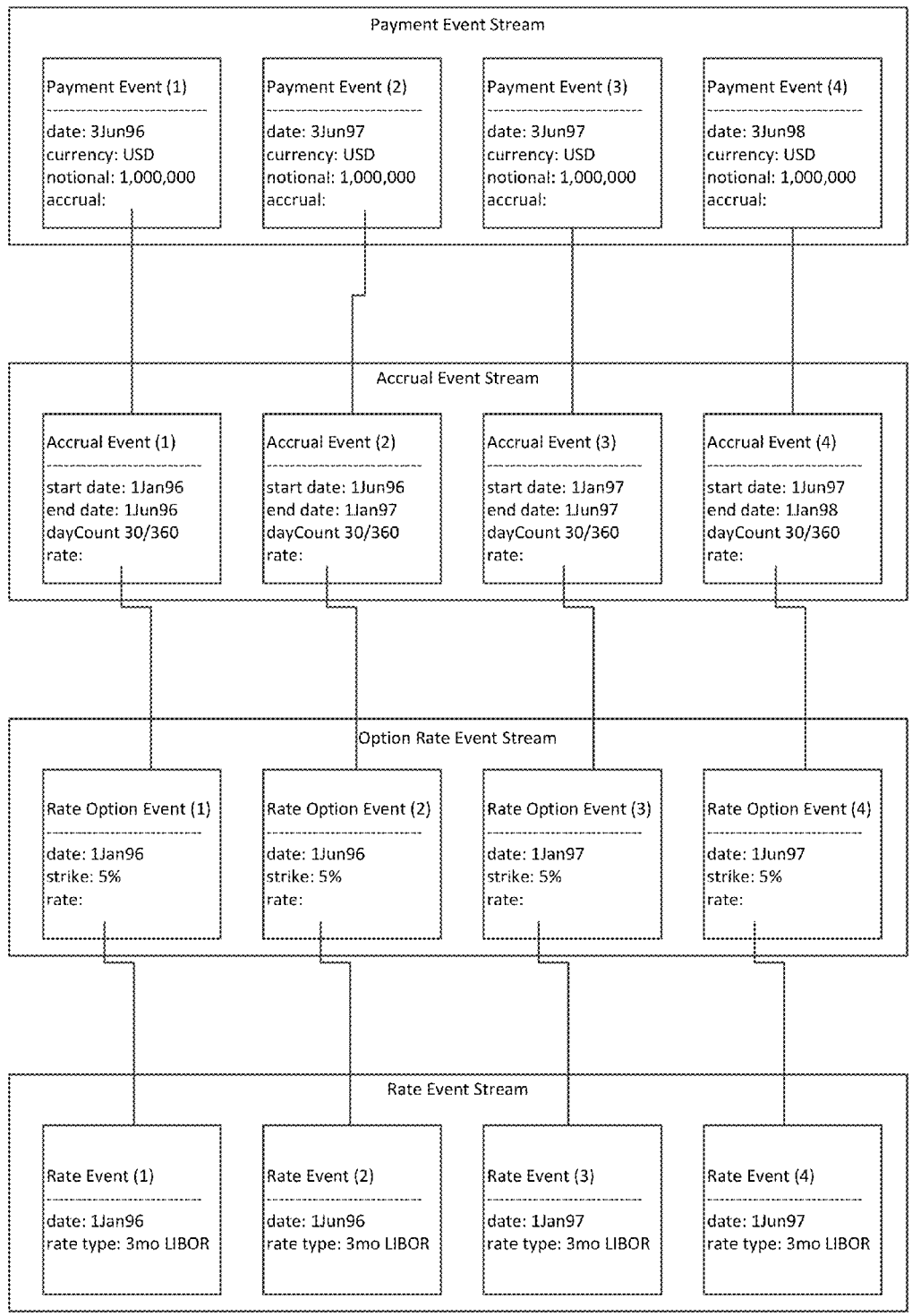
FIG. 9 is a block diagram illustrating the event stream associated with a simple option instrument.

If the event extraction process were run on the sample interest rate option specification with the given default values, the event structure would be as shown in FIG. 9.

As expected, the AccrualEvents now point to RateOptionEvents which in turn point to RateEvents. This is an outcome of the specification as described above.

2.6.1. Detailed Example of Event Extraction Mechanism

In the Section 2.3 ("Instrument Specification") we presented three ways of describing an instrument: (1) Financial Markup Language, (2) Programming Language Dependent Specifications, and (3) Algorithmic Event Generation. Of those, a generic event extraction mechanism can only be applied to the first two, whereas the third, by its very nature, defines the event generation in a procedural way. The same generic mechanism can be used for the first two if both are trans-formed into a common intermediate representation.

The nature of this intermediate representation is an object graph of spec objects. For each financial component template, and for all other elements of the instrument description that hold the financial component templates together, there exists a spec object. This spec object holds the state of the financial template. The state of a financial template consists of either simple data types, like integers, floats, dates, etc., or references to variables or events which would be generated during the generic event extraction process. Examples for such references are: the last payment event, all reset events between two dates, etc. Since this is a description of the event structure, and not the actual event structure itself, such a reference can not be stated by direct reference, but must be stated implicitly via the events collected during the event extraction process All spec objects also implement a double dispatching protocol for the event extraction mechanism. Beyond that double dispatching method, spec objects do not define any interesting behavior. All the knowledge on how to extract events is contained in the event extraction mechanism.

For instruments described in FML this implies that an FML parser generates such an object graph. Standard computer science parsing technologies can be applied to generate such a parse tree. For instruments described with a programming language dependent specification, this implies that such a specification would generate this object graph using programming language specific statements, in essence creating spec objects and "plugging" them together in order to form the object graph.

The intermediate spec object graph needs to be constructed only once for each kind of instrument. It does not contain any information particular to a specific instrument. This information is provided externally, as the instrument parameters, as explained above.

The generic event extractor that generates the "canonical" event structure makes use of the instrument parameterization and the spec object graph for the instrument kind. It double dispatches with the spec objects in the graph and, in that process, creates the appropriate events, collects them, and resolves references described in the instrument specification. Note, this is very similar to the later processing of those financial events, where financial events do not know anything about the valuation method, and all that knowledge is contained in the event processing mechanism.

In the following we discuss the objects and concepts in the intermediate representation, and the generic event extraction process in detail.

2.6.2. Intermediate Representation Objects

The objects contained in the intermediate representation fall into four categories: structural, parameterization, references, and events.

Classes and objects in the structural category describe the relationships of objects in the large: containment, grouping and naming, as well as periodicity. Classes in this category are NamedSpec, NestedSpec, SequenceSpec, and DatePeriods.

State classes describe which aspects of a spec can be parameterized, what the parameterized data for a particular instance looks like, how to represent temporary state, and how to represent the internal state of spec objects. Classes in this category are TempSpec, VarSpec, DataSpec, and FieldSpec.

Reference classes describe objects that are used to form the value of state objects. All non-literal references form the network of internal relationships between spec objects. Classes contained in this category are LiteralReference, NamedReference and ScriptReference.

Finally, event classes describe the financial components that are to be created and extracted during the processing. The classes here are EventSpec and spec classes for all financial component classes one requires in the model (e.g. PaymentSpec, InterestPaymentSpec, ResetSpec, AccrualSpec, Discount, etc.).

An example for an intermediate representation is presented in Listing 5. The specification from Listing 3 including a description of the required variables derived from Listing 1 are shown as intermediate objects. Indenting denotes containment.

Listing 5: Swap Leg Intermediate Representation

```
NamedSpec name = "SwapLegFinancialSpecification"
   SequenceSpec
      VarSpec name = startDate type = Date
      VarSpec name = endDate type = Date
      VarSpec name = paymentFrequency type = DateInterval
      VarSpec name = currency type = Currency
      VarSpec name = rateIndex type = SmileIndex
      VarSpec name = discountOn type = DiscountIndex
      VarSpec name = dayCountConvention type = Basis
      DatePeriodsSpec iterator = period
         SequenceSpec
            FieldSpec name = start value = Ref(start) type = Date
            FieldSpec name = end value = Ref (end) type = Date
            FieldSpec name = interval value = Ref(paymentFrequency)
            type = DateInterval
         ResetSpec sequence = resets
            FieldSpec name = date value = Ref(period.start) type = Date
            FieldSpec name = index value = Ref(rateIndex) type =
            SmileIndex
         AccrualSpec sequence = accruals
            FieldSpec name = start value = Ref(period.start) type = Date
            FieldSpec name = end value = Ref(period.end) type = Date
            FieldSpec name = rate value = Ref(resets.last) type = Event
            FieldSpec name = dayCout value = Ref(dayCountConvention)
            type = Basis
         InterestPaymentSpec sequence = payments
            FieldSpec name = payDate value = Script(period.end + 2 days)
            type = Date
            FieldSpec name = currency value = Ref(currency) type =
            Currency
            FieldSpec name = accrualPeriod value = Ref (accruals.last)
            type = Event
```

The intermediate representation of the spec as a whole is wrapped into a NamedSpec which states its name. A Named- Spec is a subclass of a NestedSpec and thus contains an inner spec. In the case of this example that inner spec is a SequenceSpec which groups a number of VarSpecs, followed by a DatePeriodsSpec.

Each VarSpec defines a name and an associated type and describes a parameter that is required in order to process the spec successfully.

The following DatePeriodsSpec expresses a repetition of periods and first defines the name of the iterator. It is also a NestedSpec, and since it contains more than one spec in the body, the FieldSpecs and subsequent EventSpecs are wrapped in a SequenceSpec.

Each FieldSpec describes a particular part of the state of the DatePeriodsSpec. Each is defined by the name of the state, its value at processing time, and its type. In the case of this DatePeriodsSpec, the value can not be described statically, but are determined at processing time. Their value is determined by the processing context. For all three FieldSpecs in this example the value is a NamedReference to a previously declared state, in this case to "start", "end", and "paymentFrequency", all of which were declared via VarSpecs earlier.

The ResetSpec is the first EventSpec inside the DatePeriodsSpec. It, as all the other EventSpecs, consists of a sequence identifier and a number of FieldSpecs. The sequence identifier describes into which named sequence Events generated by the particular EventSpec are added during processing time. A canonical event extractor, which extracts the unmodified and full event structure from an intermediate representation and parameters will thus, for this example, collect ResetEvents into a sequence called "resets", AccrualEvents into a sequence called "accruals" and InterestPaymentEvents into a sequence called "payments".

The references to assign a value into a FieldSpec use three new concepts in those EventSpecs. The first FieldSpec in the ResetSpec refers to a sub-state of the iterator, previously declared for the DatePeriodsSpec, it refers to the start of the period in each iteration.

The "rate" FieldSpec in the AccrualSpec refers to the last collected ResetEvent in that iteration. Similarly, the accrualPeriod in the InterestPaymentSpec refers to the last collected AccrualEvent. Thus, a canonical event extractor will, in each period, extract three Events, a reset event, an accrual event which points to the reset event, and an interest payment event which points to the accrual event.

The last interesting way to assign a value is via a ScriptReference. The "payDate" FieldSpec within the InterestPaymentSpec describes a value which is a ScriptReference containing: "period.end+days". This, in effect, is just a pretty print version of a more complex object tree containing a NamedReference and a LiteralReference, spelled out it reads: Script("addDays", Ref(period.end), LiteralReference (2)). This script is evaluated during processing and will result in the appropriate value (for all processors which actually create a value for this field in this event).

Two concepts are not illustrated by this example, the nesting of NamedSpecs and the overwriting of declared variables. A NamedSpec starts a new scope for declared variables. Only the variables declared within that scope are visible within the scope, variables declared outside the scope are not visible. Variables declared within a nested NamedSpec are accessible from the outside using a dot notation. This enables a redefinition, e.g. either a renaming, or a value assignment to the variables declared below. Such a redefinition can also happen in the same scope, e.g. a prior declaration always replaces a subsequent declaration. This is interesting when the body of a NamedSpec is included into another spec, e.g. see Listing 6.

Listing 6: Restricted Swap Leg Intermediate Representation

```
NamedSpec name = "USD3MonthLIBORLeg"
  SequenceSpec
    ConstSpec name = currency value = USD type = Currency
    ConstSpec name = rateIndex value = USD-LIBOR type = SmileIndex
    ConstSpec name = discountOn value = USD-LIBOR type =
    DiscountIndex
    Spec ref = SwapLegFinancialSpecification
```

Here, the currency, rateIndex, and discount rate are fixed. When this intermediate representation is processed, parameterization of those variables is not required and when present their values are ignored.

Another spec can also be included and renamed in the process, this gives all variables a prefix, as if nested in a NamedSpec. This is shown in the example in Listing 7.

Listing 7: Renaming in a Swap

```
NamedSpec name = "TwoLeggedSwap"
  VarSpec name = notional type = Float
  TempSpec name = first.notional ref = notional
  TempSpec name = second.notional script = "-notional"
  Spec ref = SwapLegFinancialSpecification as = "first"
  Spec ref = SwapLegFinanciaiSpecification as = "second"
```

Explicitly only one variable, for "notional", is declared in this spec. Implicitly the variables declared in the two included specs are also declared here, albeit with a prefix. Two TempSpecs are used to overwrite the "variableness" of the notional for both included specs, using the dot-notation, the one declares first.notional, the other second.notional. The temp declarations as used here, basically hook the notionals of the included specs together with the notional declared in the TwoLeggedSwap.

2.6.3. Processing the Intermediate Representation

The intermediate representation can be processed in various ways. Analogous to the ideas about valuing financial instruments and the benefits of separating the description of a financial instrument from its processing, the processing of the intermediate representation is separated from the intermediate representation. There is no knowledge in the intermediate representation on how the processing is done, except a generic mechanism that enables the processor to know which object of the intermediate representation is to be processed: the double dispatching methods.

Examples for different spec processors are: SpecPrinter (prints formatted intermediate representation), VariableExtractor (determines which variables need to be specified as spec parameters when processing a spec), EventExtractor (generates the canonical event structure from spec and parameters). Other kind of processing can include: generation of confirms, specialized event extraction for particular pricers.

In the following sections we first describe how the EventExtractor is structured and then how it processes the intermediate representation and generates the canonical event structure.

2.6.4. Event Extraction Objects

The central classes used in the processing and event extraction process are presented in Listing 8 (indenting denotes sub-classing).

Listing 8: Event processing class structure

SpecWalker an interface that describes the double dispatch operations all spec walkers must be able to perform, as well as operations for resolving references.
  SpecPrinter a class that can format and print the spec tree and its components.
  ResolvingWalker an abstract class that can resolve references.
    VariableExtractor a class that computes the required spec parameters.
    EventExtractor a class that extracts the canonical event structure.
Bindings an interface to set and access name-value associations
  Bindings.UnorderedString an implementation that uses strings and unordered associations.
WalkingContext an interface which describes access to the stack of bindings required for processing, and reference lookup and setting.
  ResolvingContext context used for resolving walker These classes form certain patterns together with the intermediate representation and for some SpecWalkers together with the parameters.

A SpecPrinter provides the simplest example. It takes only the intermediate representation as input. It then makes use of a process called double dispatching to traverse the intermediate representation. Double dispatching is a mechanism that enables us to define all the processing in the SpecWalker, yet have all the knowledge about the particular spec-structure contained in the intermediate representation. This means that one SpecWalker can process all kinds of specs build from the basic intermediate representation building blocks (later in this specification this same mechanism is applied to the processing of the financial events as well).

The protocol defined in Spec, the interface all intermediate representation objects must adhere to, requires that each Spec understands the message traverseIn(SpecWalker w), see Listing 9. Each SpecWalker requires that each implementation of a SpecWalker understands traversal messages for all intermediate representation objects, as displayed in Listing 9.

Listing 9: Spec, Reference and SpecWalker interface

```
public interface Spec{
   public void traverseIn(SpedWalker s);
}
public interface Reference{
   public Object getLiteralIn(Specwalker w) throws ReferenceNotDefined;
}
public interface Specwalker{
   void traverse(NamedSpec s);
   void traverse(sequencespec s);
   void traverse(DatePeriodsSpec s);
   void traverse(EventSpec s);
   void traverse(VarSpec s);
   void traverse(TempSpec s);
   void traverse(FieldState s);
   void traverse(DataSpec s);
   Object getLiteral (NamedReference ref) throws ReferenceNotDefined;
   Object getLiteral (ScriptReference ref) throws ReferenceNotDefined;
   Object getLiteral (LiteralReference ref) throws ReferenceNotDefined;
}
```

In each particular implementation of a spec the call to traverseIn(SpecWalker w) is bounced back to the SpecWalker immediately, with w.traverse(this), or in the Smalltalk implementation with walker traverseVarSpec: self. The compiler takes care about the appropriate method dispatch in Java; that information is encoded in the method name in the Smalltalk implementation.

The implementation for traverse(SomeSpec s) in a particular SpecWalker then processes that particular spec. E.g. a SpecPrinter would print the name of the spec, and prints the internal state. A SpecWalker knows about the internal structure of a Spec, e.g. for a NamedSpec, the SpecWalker is allowed to access the name, and it can access the nested spec, it is not allowed to assume though which particular spec is contained as the nested spec. Instead it double-dispatches to that nested spec, using nestedSpec.traverseIn (this), or in Smalltalk nestedSpec traverseIn: self. The nested spec then bounces back as discussed before, and the correct spec processing method in the SpecWalker will be called.

The traversal of specs does not return any value. Thus references have their own double dispatch protocol which enables the SpecWalker to retrieve the value of a reference within the context of the current processing. A reference can be asked to getLiteralIn(aSpecWalker) and will bounce back to the SpecWalker with aSpecWalker.getLiteral(this), or in Smalltalk aSpecWalker getLiteralNamedReference: self. Returned is an object which represents the value of this reference at this point of processing. How the reference is resolved and how events are collected is discussed in the following section.

2.6.5. Event Extraction Process

Whereas the SpecPrinter only interacts with the intermediate representation and does not require to keep any processing context, the EventExtract and the VariableExtractor both need to resolve reference in order to compute their value. They both inherit the appropriate behavior from a common superclass named ResolvingSpecWalker.

The ResolvingSpecWalker keeps an instance conforming to the WalkingContext interface (see Listing 10). This is an object which maintains a stack of Bindings and can be asked to push and pop a new Bindings object, to store and retrieve the value for a given name, and to collect and retrieve events.

Listing 10: Bindings and WalkingContext interface

```
public interface Bindings{
   public static Object UnknownValue = new Object( );
   public static Object InitialValue = new Object( );
   public void put(String name, Object value);
   public Object get(String name);
}
public interface WalkingContext{
   public void push(String name, Bindings frame);
   public void push)Bindings frame);
   public void pop( );
   public Bindings peekBindings( );
   public String peekNames( );
   public void put(String name, Object value);
   public Object get(String name) throws ReferenceNotDefined;
   public String getScopeName( );
   public Events getEvents (String name) throws ReferenceNotDefined;
   public Hashtable getEvents( );
   public void collectEvent(String name, Event event);
}
```

Every time the resolving spec walker processes a structural intermediate representation object it pushed a new Bindings object on the context. If a NamedSpec is processed the name of the spec is pushed as well. This stack of bindings and names forms the basis for the value lookup mechanism implemented in the concrete implementation for the WalkingContext. Currently one such implementation exists, the ResolvingContext.

When an object is stored into the WalkingContext it is just stored into the top Bindings object. When an object is retrieved via its name from the context and can not be found in the top binding, the subsequent bindings are searched. For each bindings frame which is named, the name is used as a prefix to the current search name. This implements the overwriting mechanism presented in Listing 7. Note, that the initial name will never be a compound name (using the dot-notation), since the access of names from outer scopes is not permitted.

Listing 11: Getting an object in the ResolvingContext

```
public Object get (String n) throws ReferenceNotDefined{
    Bindings frame;
    Object result;
    String name = n;
    String frameName;
    for (int i = frames.size( )-1; i>=0 ; i--) {
        frame = (Bindings) frames.elementAt(i);
        result = frame.get(name);
        if (result != Bindings.UnknownValue) return result;
        frameName = (String)names.elementAt(i);
        if (frameName != UnnamedFrame) {
            name = frameName + "ů" + name;
        }
    }
    throw new ReferenceNotDefined( );
}
```

When the ResolvingSpecWalker processes a VarSpec, the current value for a reference of that name is retrieved and stored into the context (see Listing 12). If the value can not be found an error situation has occurred, since the parameterization is required to contain all VarSpecs which are not overwritten.

Listing 12: Traversing a VarSpec in the ResolvingSpecWalker

```
public void traverse (VarSpec v) {
    object value = null;
    Reference ref = new NamedReference(v.getName( ));
    try {
        value = ref.getLiteralIn(this);
    } catch(ReferenceNotDefined e) {
        System.out.println("Error: variable" + v.getName( ) +
        "not defined");
    }
    context.put(v.getName( ), value);
}
```

A TempSpec and DataSpec are handled in similar ways, for a TempSpec the reference is retrieved and stored in the context, for a DataSpec, the literal object is simply stored into the context.

When retrieving a NamedReference the ResolvingContext first checks if that reference refers to an event, and if so the event is returned (if a dot notation is used, the correct subpart of the event is returned). For a LiteralReference the value is returned directly since it does not need to be evaluated in a context. A ScriptReference is evaluated by executing the script, using the perform mechanism in Smalltalk, and the reflection mechanism in Java.

The VariableExtractor makes use of this framework by overwriting the implementation for the VarSpec. Its task is to find all required parameters for processing a spec in its intermediate representation form. Instead of raising an error when not finding the value for a NamedReference of the same name, the required variable is collected with the proper prefixed name (if required), and an initialValue is assigned and registered in the current context.

Listing 13: Traversing a VarSpec in the VariableExtractor

```
public void traverse(VarSpec v) {
    Object value = null;
    Type type = null;
    String n = v.getName( );
    Reference ref = new NamedReference(n);
    try{
        value = ref.getLiteralIn(this);
    } catch(ReferenceNotDefined e) {
        // register in variables
        String scope = context.getScopeName( );
        value = Bindings.InitialValue;
        type = v.getVarType( );
        String k;
        if (scope.equals ("")) {
            k = v.getName( );
        } else {
            k = scope + "ů" + n;
        }
        variables.put(k, value, type);
    }
    context.put(n, value);
}
```

In contrast the EventExtractor can assume that all required parameters are defined. Instead, its focus is the creation of the appropriate Events and their collection into the proper event sequence. In contrast to the VariableExtractor it also needs to handle the iterator object properly.

The event generation for all events is handled in the same way. If it is required by a SpecWalker to treat EventSpecs for different kinds of Events differently, a sub-interface of the SpecWalker is used, which defines protocol for those kinds of EventSpecs explicitly. In the generic EventExtractor an Event is created for an EventSpec by first accessing a Map from EventSpec classes to Event classes. The found class for the particular EventSpec is then asked to create an instance. This instance is then filled with the proper state by iterating over the FieldSpecs. For each such spec the current value for the reference contained in the FieldSpec is retrieved and that state is set into the Event by using reflection (using another mapping from names used in the FieldSpecs to instance variables used in the particular event).

After the state of the event is filled it is stored into the context under the sequence name for that EventSpec. When collecting events the ResolvingContext asks the Event for its preferred Event Collection object. Thus payment events can be collected into a payments collection, whereas reset events are collected into a resets collection. If no preference is given a generic collection is used. Which kind of collection is used is significant for the second step of processing the event structure and e.g. pricing it. The double dispatch mechanism there will make use of the different collections events have been collected in.

The iteration objects (e.g. DatesPeriodSpec) need to be rolled out when extracting events. Analogous to event generation, first a new DatePeriods object is created and its state is filled with values described in the collection of associated FieldSpecs. Based on that object an iterator object is initialized. A context for the iteration is pushed and for each iteration, the next value of the iterator is assigned into the name originally specified in the DatesPeriodSpec. Then the nested spec is traversed using the double dispatching protocol explained above. At the end the context is popped.

Listing 14: Traversing a VarSpec in the VariableExtractor

```
public void traverse(DatePeriodsSpec s) {
    DatePeriods p = new DatePeriods( );
```

-continued

Listing 14: Traversing a VarSpec in the VariableExtractor

```
this.setState(s, p);
BluePeriodGenerator it = new BluePeriodGenerator(p.start,
p.end, null, null, p.
    interval, false);
if (!it.hasMoreElements( )) return;
context.push(new Bindings.UnorderedString( ));
for (;it.hasMoreElements( );) {
    context.put(s.getIteratorName( ), it.nextElement( ));
    s.getSpec( ).traverseIn(this);
}
context.pop( );
}
```

2.7. Benefits of the Financial Instrument Structure

There are several benefits of the financial instrument structure described above that are very interesting from the system design perspective. These are described briefly below.

2.7.1. Persistence-Relational vs. Object Oriented Databases

New exotic financial instruments evolve quite rapidly and they are typically characterized by very complex event structures. These event structures are typically quite diverse. One cannot expect them to be regular extensions of a common structure. An important aspect of an exotic financial system is its ability to incorporate these new instruments and their event structures in a timely manner.

Modern object oriented databases allow complex object graphs to be made persistent. One can design the object model and assume that the database will map the object into a form of persistent storage. The object model effectively "is" the data model so no explicit data model is required. This greatly simplifies the entire development process from the point of view of the developer, especially when the object model becomes quite complex.

Relational databases, on the other hand, require not only an object model but an explicit data model and an explicit mapping between these two models. Both the models and the mapping strategy must be kept synchronized at all times for proper persistence behavior to be maintained. This requirement increases the amount of effort and overhead incurred by the business application developers when designing and implementing functionality.

The above discussion points out the major theoretical reasons why complex financial products can be better served by an object oriented database. There is typically more overhead when using a relational database as a persistence mechanism for object oriented systems that depend upon highly complex object models.

As stated in Section 2 ("Financial Instrument Internal Structure"), every instance of an instrument can be represented either statically or as an event structure. This flexibility can allow a developer to employ a relational database with far more efficiency. It is now possible to make persistent only the static representation of an instance of any given instrument. The event structure can, by definition, always be obtained by transforming the static representation, thereby removing the need to make the event representation persistent.

This benefit is obtained, however, only if one makes the assumption that the parameters in the static representation of an instrument are far less complex than the actual events in the event representation. This assumption seemed reasonable initially and has proven itself to be correct in all implementations to date.

One additional benefit is that one can now store instances of financial instruments in more or less constant space with respect to maturity. In many other implementations where the event structure is stored, the space necessary for persistence is linearly proportional to the maturity of the instrument.

2.7.2. Implementation Factoring Benefits

The factoring of the financial instrument structure allows a developer to independently choose the class (and therefore class hierarchy) for the specification and the parameters. This allows the developer to create a new instrument that has a description (i.e., specification) that is much like an existing instrument, yet create a data binding based on a completely different instrument.

2.7.3. Specification Composition

The design also allows specifications to be "used" or "included" by other specifications. This composition strategy gives the developer a mechanism for naturally modeling the fact that, in many cases, new instruments are based not only on similar events but on similar event specifications.

The most relevant example of this is in the case of an option to enter into an underlying contract. In most cases, the specification of such an instrument is simply the specification of the underlying instrument plus more information. This mechanism allows the developers to re-use the underlying specification as a part of the new specification.

3. GENERIC PROCESSING FRAMEWORK

As stated numerous times above, one of the key design goals was to separate the description of financial instruments from the processing of the instrument. Processing objects take the event representation of an instrument, i.e. its macro structure, and operate on the events and parameters to compute some output value or values. This was done to allow development of new instruments to proceed orthogonally to the development of new processing functionality It is very important to note that in this design the valuation operation, or pricing, is simply a specific type of processing. In terms of trading and risk management, pricing is the most critical operation. So it will typically be the most visible type of processing, but a type of processing nonetheless. This means that the general framework for both pricing and other kinds of processing objects will be exactly the same.

The design of this part of the system implements a framework that allows processing objects to walk over an instrument's financial event representation and implement an operation for each and every kind of event that they encounter. The concept is that the total processing algorithm is implemented via proper operation on all of the financial events. This is very much analogous to the concept described earlier; that financial instruments can be created by defining the structure and relationships of base financial components. That is, if we can define instruments via composition of basic components then we should also be able to define processing algorithms composed of operations on these basic components.

3.1. Basic Object Oriented Processing Framework

The goal of this basic object oriented processing framework is to supply the tools necessary to implement event based processing for any purpose, be it pricing, processing, querying etc. This framework, once completed, is then leveraged to implement frameworks for the different types of functions. An example of a possible class hierarchy is depicted in FIG. 10.

Figure 10:
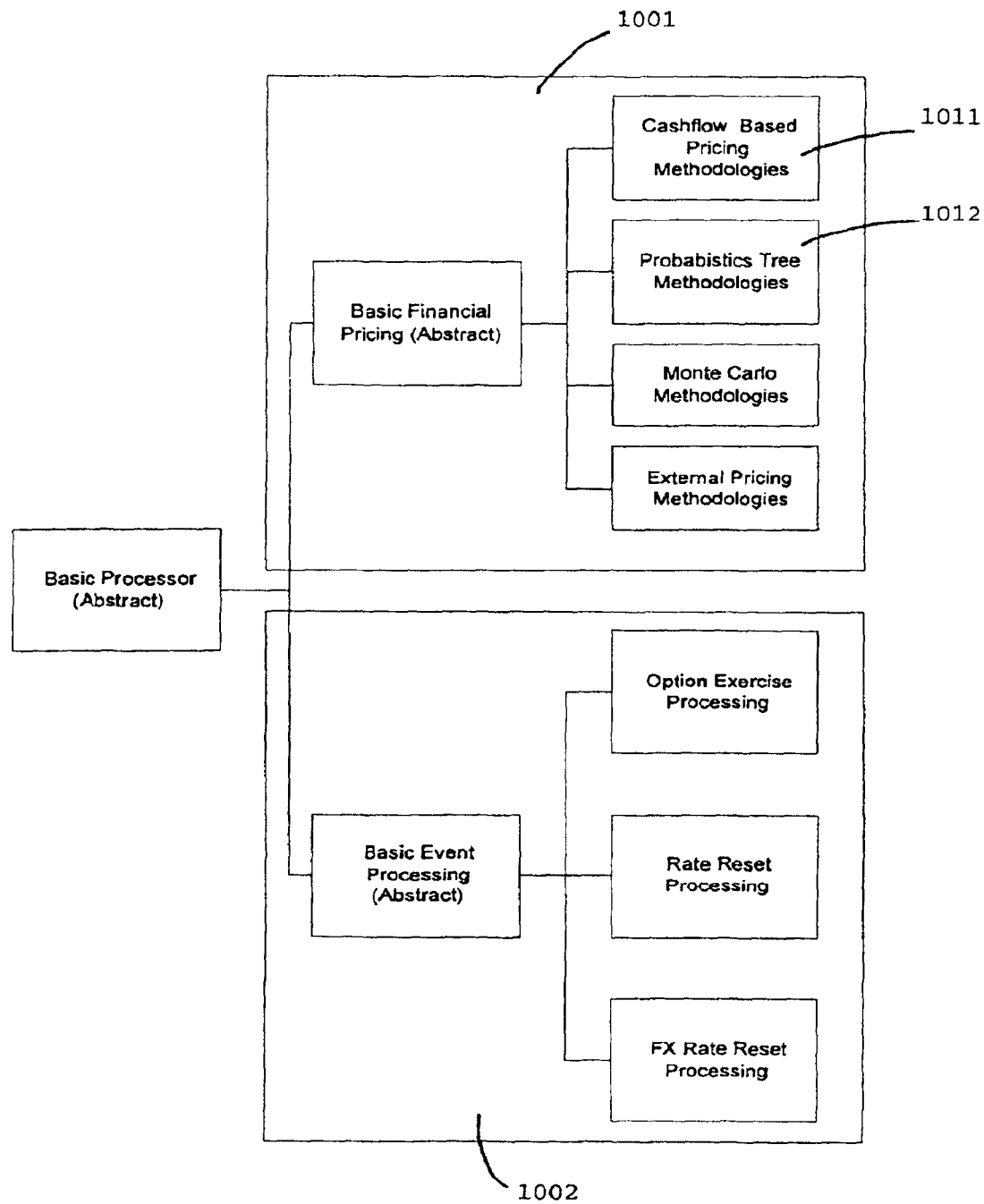
FIG. 10 is a block diagram showing an example of a class hierarchy that might be used to implement processing objects.

As seen in FIG. 10, the example hierarchy initially divides into sub-hierarchies that provide frameworks for product pricing 1001 and generic event processing 1002.

The pricing framework then divides into frameworks 1011, 1012, etc. to support different types of pricing. It is important to note that the types of pricing defined are based on pricing methodologies instead of actual product types. This differentiation is necessary to provide the flexibility to define many different pricers for a given instrument type.

For example, it is true that one could price an interest rate swap instrument using multiple methodologies; a cashflow present value approach, a probabilistic tree based approach and a Monte Carlo approach. This framework easily allows for multiple implementations of pricer classes for this type of instrument and also provides the necessary framework for each implementation.

The processing framework provides a generic way to walk over an instrument's macro structure and extract useful information. For example, one could implement a processor that would in effect "query" every product macro structure for all option exercise related events. This processor would be applicable to every existing instrument as well as all future instruments as long as the set of events with option exercise characteristics were consistently defined and utilized. This significantly reduces the amount of maintenance effort required to introduce new instruments as well as increasing the control aspect of critical event processing.

The responsibility of the top level BasicProcessor class in this example is quite simple. In this class a valueEventType: anEvent method is defined for each an every event type that exists (where EventType is replaced with the name of the event class). The implementation of this method for each event effectively registers this event type with the processing system. This means that as developers add event types the only initial requirement for processing is that a method be entered on this class for that event type.

Also, a valueGenericEvent: anEvent method is defined. The event specific valuation methods described above are implemented to immediately call this generic method. Hence, initially, this framework provides that any event will, by default, be processed as a generic event. The implementation of the valueGenericEvent: anEvent is a subclass responsibility.

If a developer wants to handle an event in a non-generic manner in any processing sub-class he must simply override the initial implementation of the event's registered valuation method.

The BasicProcessor class also implements a valueEvents method. This method, when invoked on an instance of a processor, should return the "value" of the instrument when invoked. The implementation of this method is deferred to the sub-classes of the BasicProcessor class and what the "value" is can vary widely.

Therefore, the top level framework provides the following features to developers:
- A registration service that defines one valuation method name for each event type
- A mechanism by which all event types, unless otherwise overridden in the subclass implementation, are treated as generic events
- A default event valuation method that is meant to be overridden by each subclass so that default processing behavior can be easily implemented by processor developers
- An API, valueEvents, that is the main entry point for initiating a valuation on an instance of a processor.

The combination of the way in which the valueEvents method and all event specific valueEventType:anEvent methods are implemented amounts to the definition of the processing action of any given processing sub-class.

3.2. Micro Structure Processing

As described earlier, for each specific type of financial event, a processor defines a method which computes a result (i.e. valueEventType: anEvent). The type of result, for the given financial event, is purely dependent on the type of processor in question.

For example, a processor that is used to obtain the "price" or MTM of a financial instrument would calculate results for financial events that would be combined to produce this price for the instrument. A processor that was responsible for querying the instrument to determine all payment flow dates for the next N days would return quite different results for each financial event. It might even ignore some financial events that were not relevant to this operation.

For each specific type of financial event, a processor can only rely on the micro structure of that event. The action to be performed for each type of financial event is defined, in the processor, independently from the action for any other type of financial event. It cannot assume a specific type for any nested financial event, only that the nested events adhere to the stated interfaces. These interfaces can be used to provide processor independent information about the internally nested events.

This can be illustrated by the specification examples detailed earlier of the interest rate swap leg and the interest rate option instruments. The major difference between these two instruments is that the accrual event points to a different type of rate event. In the former case it points to a basic rate event and in the latter case it points to a rate option event. This is allowable because the micro structure of the accrual event expects a "rate interface" in the rate instance variable of the accrual event and both types of rate event satisfy this interface.

All processor dependent results are obtained via a double dispatch mechanism which encapsulates the processor and separates it from the actual type of the nested financial events. This mechanism chooses the next processing step inside the processor for a nested financial event based-on the actual event type.

3.3. Macro Structure Processing

The actual event type that is nested within any financial event is completely determined by the macro structure of the instrument being processed. As described earlier, the macro structure of an instrument defines the actual events and their relationships to each other. It is this macro structure which determines the overall processing of the instrument. Thus, a processor does not require, and is not permitted to have, any a priori knowledge of the structure of a given financial instrument.

This is a very important concept as it allows a processor to process any well formed macro structure because the macro structure itself drives the sequence of processing steps.

This is best illustrated by an example. Suppose a processor inquires of a given macro structure for its payment events. Only the macro structure has the knowledge of what kind of payment event types are actually contained in this set. Upon receipt of these events the processor visits each event and uses the double dispatch mechanism to choose the right method for processing the actual event type.

When a method is chosen to process a given payment event, that event is then processed as described in Section 3.2 ("Micro Structure Processing"). While in this processing mode the double dispatch mechanism is used again whenever a processor dependent result is required for an event nested within the payment event. This again causes the proper method to be selected based on the actual event type in question and this event type is defined by the macro structure.

Therefore, the actual methods and the order in which they are visited on the processor object is completely determined by the macro structure. In this way we say that the macro structure drives the processing of a financial instrument.

In summary, a processor just defines what to do for each specific event type and the macro structure determines which methods are visited and in what order.

3.4. Basic Description of Double Dispatch

As described earlier, a double dispatch mechanism is employed to determine which processing method is chosen for a given financial event within a given processor. The example below will illustrate how a double dispatch design pattern is used to implement this behavior.

Figure 11:
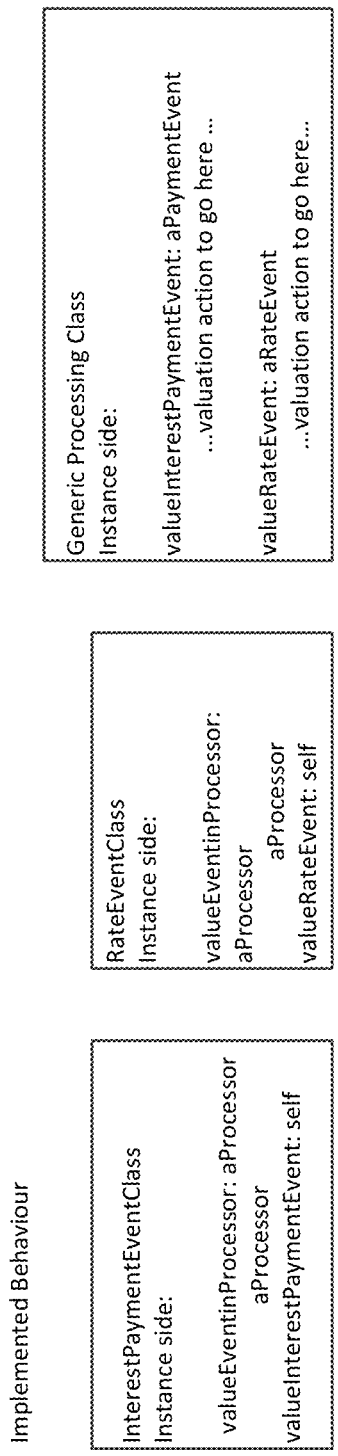
FIG. 11 is a diagram showing certain methods implemented on event and processing classes.

FIG. 11 depicts the methods that need to be implemented on the event classes and on the processing class to effect a double dispatch paradigm. The method implemented on the event classes, valueEventInProcessor: aProcessor, is meant to be polymorphic across all event classes. These methods essentially define a mapping between the class type and the type of processing that it expects to receive within a processor. It is crucial to understand that these methods do not specify anything about what the processing actually accomplishes, they simply specify which category of processing should be applied to the instance by the processor.

The methods implemented on the processor class are meant to explicitly define the processing algorithm for each type of financial event. It is important to realize that these methods make absolutely no assumptions as to where the event sits in a given macro structure, they simply process an event of the given type based on the event's micro structure. Note that this does not mean that external information, such as market data, cannot be used as a context when processing an event. It is the relationships of the events (i.e. the macro structure) that cannot be assumed by the processor, all other contextual information is allowable in this strategy.

Figure 12:
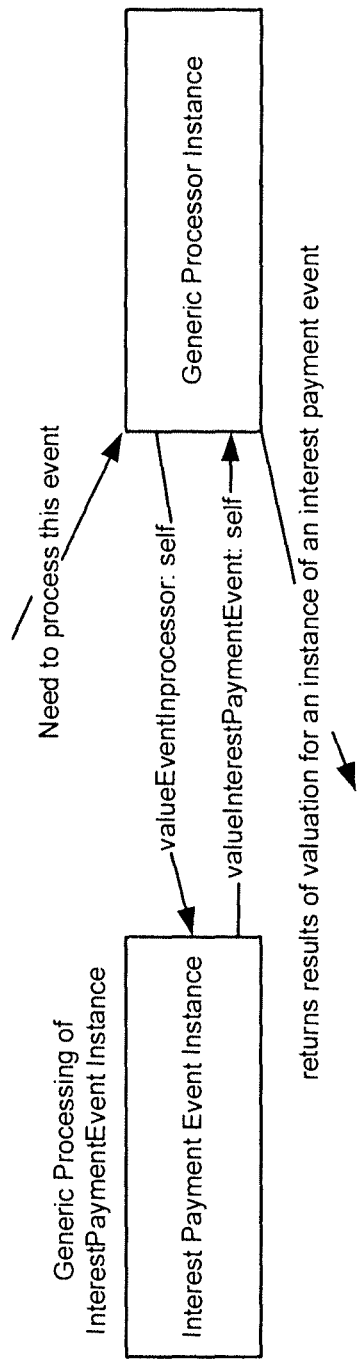
FIG. 12 is a block diagram illustrating a sequence of events involved in a double dispatch mechanism.

In FIG. 12, one can see an example of how an instance of an interest payment event is processed in a given processor. Assume that we are in a processor method for a given event type. This method requires a processor dependent valuation of a nested event. At this point, the nested event type is not known beyond the interface declared in the micro structure for the enclosing event.

The processor sends the message valueEventInProcessor: self to the nested event. As described earlier, all events must support this interface for proper processing. The event responds by sending the appropriate message back to the processor based on how this method is implemented for its class. In this case, an instance of an InterestPaymentEvent will send the message valueInterestPaymentEvent: self back to the processor instance. At this point, the processor knows the actual type of the nested event and can proceed with processing according to the micro structure of that event. Thus, the previously nested event now becomes the event being processed. Once again, the processor has no knowledge of and should make no assumptions on how the event is embedded in the macro structure of the instrument.

This process occurs recursively within any event if there is a need for processor dependent valuations of its nested events.

3.4.1. Nested Double Dispatch

Nested double dispatch is a mechanism that allows the developer to process any event contained in its micro structure via the double dispatch mechanism. This nested process allows this to occur any number of times. FIG. 13 represents a nested double dispatch.

The nested double dispatch simply allows the double dispatch mechanism to be used at any point in the valuation of any other event. The value of the nested dispatch is returned to the calling method and used within the context of the valuation of that event.

3.4.2. Detailed Description of the Pricing Framework

Because valuation/pricing is such an important aspect of the modeling and implementation of financial instruments this section will give more detail on this topic.

3.4.2.1. The Cashflow Valuation Methodology Implementation

The implementation of the cashflow valuation methodology is a good example because the BasicCashflowPricer class implements a framework which, when applied to a given instrument's macro structure, defines how the macro structure is processed.

Essentially, this class implements a framework that causes all cashflow events to be processed at the top level. A present value is calculated for each cashflow event found in an instrument's macro structure. The value of the instrument is defined to be the sum of all these present values. The code in Listing 15 illustrates this framework:

---
Listing 15: Basic Cashflow Pricing
---
Implemented Behaviour
Cashflow Pricer Class
Instance side:
valueEvents
sumCashflows =0
self.instrument.events do:[:anEvent | sumCashflows =
   self.presentValue(self.valueEvent (anEvent))
]
return sumCashflows
------------------------------------
valuePaymentEvent(thePayment)
return thePayment.notional
------------------------------------
valueGenericEvent(theEvent)
return 0 .0
------------------------------------

The valueEvents method is overridden from the super class to walk over all events that exist in the instrument, obtain the present value for each value and sum the resulting values. The value of each event is determined by its type by the double dispatch mechanism. Therefore, if an event is a cashflow event the valueCashflowEvent: anEvent code is executed and returns the notional value of the cashflow. If the event is of any other type, the framework described earlier forces these events to be valued as generic events. In this case, the cashflow pricer has defined the generic event method to return zero. Hence, only the values of cashflow events will be included in the final summation.

In this manner we have created a processing function by simply summing up the valuation methods implemented for given events. This framework can then be easily extended by subclasses by simply overriding the valueCashflowEvent: anEvent to perform other, more complex operations.

3.4.2.2 Extending the Basic Processing Framework

The basic cashflow pricing framework can be easily extended in a sub-class to handle a more complex cashflow event, a swap payment event that was described earlier in FIG. 8. A set of events that represents one of these payments is depicted in FIG. 14.

The additional/overridden methods for the sub-class of the BasicCashflowPricer are shown in Listing 16:

---
Listing 16: Fixed Swap Payment Pricer Methods
---
Fixed Swap Payment Pricer
Instance side:
------------------------------------
valuePaymentEvent(thePayment)
  return
    thePayment.notional*self.valueEvent(thePayment.accrual)*
    thePayment.accrual.rate
------------------------------------
valueAccrualEvent(theAccrual)
  return (self.endDate-self.startDate)/self.dayCount
------------------------------------

One can see here that by changing one method and adding one more method this new sub-class can value a more complex payment event within the framework already implemented. Essentially, this subclass has defined that the payment event's value will not be the product of the notional, the rate and the accrual period. The value of the accrual period is achieved via nested double dispatch as it is valued from within the valuePaymentEvent method. This causes the valueAccrualEvent method to be invoked and the value returned.

The framework already supports summing all the cashflow relevant events and taking their present value so this is all the new sub-class must implement to effect a significant change in the valuation method.

3.4.2.3. Supporting Multiple Valuation Methodologies

As mentioned several times, there are usually multiple ways in which to value any given instrument. These are divided up into methodologies as reflected by the sub-classes of the Basic Financial Pricing class as depicted earlier. Typical methodologies include:
- Cashflow present valuation methodologies—Each valuation relevant event (e.g.—a cashflow) of a product is valued independently using accepted analytics and the present value is taken.
- Probabilistic tree valuation methodologies—A probabilistic tree is built that is used to determine the valuation of the instrument's events.
- Monte Carlo valuation methodologies—A true simulation is built and driven with some inputs to determine the valuation of the instrument's event.

The above is by no means an exhaustive list of available valuation methodologies. The important concept is that one must provide a framework that can support any number of methodologies as they invariably evolve over time.

If it were desired to be able to price a swap instrument in all the above methodologies one would expect to find one class in each hierarchy that would be capable of this functionality. Then, one could choose the valuation methodology at run time by choosing which class of pricer instance to apply to the instrument.

3.4.2.4. Support for Analytics Implemented in Other Technologies

The analytics for any one methodology can also be implemented in different types of technologies. One typically finds that, as the computational resources required for a given analytical implementation increase, the level of implementation language decreases. This is simply because lower level languages tend to provide better performance on the same hardware. Hence, one would expect to see computational expensive implementations of Monte Carlo simulations implemented built in procedural languages such as C or Fortran. This is by no means always the case but is a good rule of thumb.

Therefore, the pricing framework must also provide for interfacing with analytical implementations that may not be in the same technology. This is typically done by providing an interface between the two technologies in which instrument data is passed into the analytics and pricing data is passed back to the main application. The cross-technology interface is simple to achieve. The issue left to resolve is, how does one convert between the object model of the instrument in the main system and the representation required by the analytical implementation?

The answer is that the pricing framework is essentially reduced to a data format conversion function. The framework for each type of external interface would walk over an instrument's events and, instead of calculating values itself, it would simply convert the applicable events to a data format specified by the external interface. Once a framework for each interface is built it becomes much simpler when new analytical implementations are available for that interface type.

3.5. Benefits of Separation of Processing from Instrument Specification

The classic object oriented view is that the definition of an object should encompass its state and its behavior. This design, on the other hand, specifically and explicitly separates what can be considered behavior from the description. The question raised is—Why is this deemed necessary?

3.5.1. Long Term Design Stability

Let us consider the classic case. Consider the instrument specification defined in Section 2.5 ("Simple Instrument Specification"), which describes a simplified version of an interest rate swap leg and an interest rate option instrument. In the classic object oriented paradigm, all processing methods would be implemented on these objects. For example, the swap object would know how to value itself, return a series of known and unknown payments etc.

To implement a properly modular system around instruments developed in this manner, developers typically define an appropriate interface. This interface typically represents all of the necessary functionality that any instrument must provide to the rest of the system to "fit in". The creation of a new instrument class simply requires that the developer implement the well-defined interface properly for the instrument in question. It is unimportant how the developer implements the interface for the instrument as the interface is meant to hide all the internal complexity of an instrument from other objects.

This strategy seems quite reasonable on first consideration. It is a properly "object oriented" approach and simple to implement. In practice, this approach would work quite well during the initial phases of a financial instrument model.

In reality, however, one must consider the viability of such a model well into the later stages of its existence. The simple interface approach begins to fail as it becomes necessary to add more processing functionality to the system as time marches on. It is always necessary that the new functionality be applicable to not only newly developed instruments but to all existing instruments as well.

This means that all existing implementations of financial instruments would have to have the additional interface individually coded by a developer. As the total number of supported instruments grows, this becomes quite a difficult task. Each new interface can require an inordinate amount of effort, especially if the internal complexity of each existing instrument is not well understood by the developer tasked with upgrading it.

The separation of processing from the instrument class and a well defined processing mechanism mitigates this problem. If the model is adhered to, one can expect a new processing class to operate on all existing financial instruments as well as any new instruments. This means that if the interface needs to be extended one simply writes a new processor. This reduces the extension of the interface to a single development step as opposed to a series of steps that will get more difficult as the system grows.

3.5.2. Pricing Framework Benefits

There is another reason, more specific to valuation models in the financial arena, for the separation of processing objects from instrument description objects.

As stated earlier, one of the major uses of many financial systems is for risk management and pricing purposes. This means that a very important subset of processors are the "pricer" classes. These classes process financial instruments, in the context of a set of market data, and return a monetary value or "mark-to-market" (MTM) of the given instrument. This MTM is a function of the instrument itself, the market data and the valuation methodology.

In the financial pricing arena, there are typically several valuation methodologies that can be used to return a $M^{TM}$ for a given type of financial instrument. In many cases, there is not really a "correct" methodology. The methodology to be used is usually chosen based on a trade-off between accuracy and performance. Typically, the more accurate a pricing methodology the more resources are required.

This means that one instrument can be valued in several different methodologies and the decision as to which methodology is to be used can vary over time. The ability to easily choose a pricer object that implements the desired methodology is a very important and powerful advantage of this model. This is not easily done if all of the processing/pricing knowledge is implemented on the instrument itself.

An additional benefit is that pricing objects can share basic behavior via inheritance and that these objects can be used for multiple instruments. Otherwise, if the processing behavior is implemented directly on the instruments there would be a large degree of code duplication.

4. FUTURE WORK

The following sections briefly point to areas that we are currently investigating to broaden the use of our model.

4.1. Lifecycle Support of Financial Instruments

The current focus of the representation of instruments in our model is towards valuation and risk management in front-office and mid-office. Clearly, other kinds of processing and thus other kinds of attributes are imaginable and desired during the lifetime of a financial instrument.

One interesting approach is to think of a financial instrument not as having only one associate specification and parameters, but to see it as a bag of specifications and parameters, changeable over the lifetime of the financial instrument and targeted towards the different demands of those domains.

One example for this approach is an audit trail. Up to the point where a trade is confirmed no audit trail information needs to be kept, the instrument is in the front-office experimental stage. As soon as the trade is confirmed an audit spec and audit parameters are added to the instrument, stating which finance parameters can be changed at all, by whom, and also how and where to record the audit trail. The audit trail might actually be recorded right in the instrument itself, as a read-only state related to the audit specification, or it might be recorded in a relational database the audit spec refers to.

Another example is the information required for the back office. As soon as an instrument enters the back-office, a back office spec and associated parameters are added and can describe things such as when payments were made and received, what kind of netting agreements affect the current instrument etc.

4.2. Process Specific Event Extraction Transformations

The approach presented in this paper always uses one event extraction process, which produces the "canonical" event structure, as explained above. For certain kind of event processing, it would be beneficial to use a process-specific event extraction process. This would allow processing designers to fine-tune the time and space behavior of event extraction and event processing.

Instead of asking the instrument directly to generate and return an event structure, this request would always be delegated via the processing which is interested in processing the resulting events. It could then decide not to employ the "canonical" event extraction process, but to use a process specific event extraction process instead. The canonical event structure would still be returned in most cases and also serves as an important concept, since a specification should always be written to generate a canonical event structure which resembles the "real-world" structure of the financial instrument most faithfully. Yet, one would also have the opportunity to optimize special processing cases.

For example, the processing of resets only requires the generation of reset events. The processor could use a specialized event extractor which would ignore the other event streams and only instantiate reset events.

Another example is the integration of external processing methods which are not written using the processing methodology presented here. Such processing methods might be using old existing systems, or they might come from other departments, e.g. the research department, which do not use the same modeling and processing methodology. Often the interface to such systems are one or more function calls which require lists of various dates and values which, in the approach presented here, are spread across various events in the canonical event structure of an instrument.

In the current system this is done by generating all events in the canonical event structure and then running a processor which extracts the relevant data from the event structure.

A specialized event extractor for such processing might not even generate events at all, but instead directly collect the appropriate values into arrays which can then be used as arguments to the external processing method.

Both cases show the advantage of having a specification which can be processed to generate appropriate events, over algorithmically generated events. In the latter case one would need to copy and then rewrite the central part of that algorithm to satisfy the different out requirements. Furthermore, this could not be done in an instrument independent manner, as in the specification based approach, but would have to be done for every instrument which would require such processing.

4.3. Separating Default Values from Specifications

In its current form the default values for variables are contained in the specification itself. This is not suitable for an international usage of instruments. A trader creating a new swap leg in Tokyo expects to see a different initial setting of the state than a trader creating a new swap leg in New York.

One solution would be to create a new kind of specification for default values. The core of a financial specification would stay the same, but the default specifications would be set based on the user location.

The additional benefit of such an approach would be that the knowledge of interrelated default values could be embedded in such a default-specification. For example, the knowledge to adjust basis and tenor according to a changed currency could be embedded in the default specification instead of in the user interface of the instrument.

5. CONCLUSION

Our experience shows that the model described here offers significant benefits to the developers of financial systems that must use object oriented technologies to represent financial instruments. As currently implemented, it is biased towards systems where pricing and large scale life cycle processing are the main deliverables. But, we believe that it is flexible and generic enough to be used successfully in various other capacities.

One of the main goals of this project was to design a model that could be maintained and extended for many years to come. Much thought and effort went into the design to try and accommodate the unknown future requirements of the financial industry. While we recognize that we could not have covered all possibilities, we believe that we have significantly hedged our future needs.

The model described here has been implemented, to varying degrees, in both Smalltalk and Java. Both implementations are in production in the JP Morgan Fixed Income systems group. We believe that this model has significantly improved the ability of the systems teams to manage and exploit the explosive growth in the Fixed Income business.

By the end of 1998, this model will be used to represent, process and store all financial trades, both simple and exotic, for the global JP Morgan Fixed Income business.

It is apparent from the foregoing that a new system has been developed that accomplishes the stated objects of the invention. While the presently existing embodiment and certain variations thereon have been described in detail, it will be apparent to those skilled in the art that the principles of the invention are readily adaptable to other adaptations and configurations of the systems described herein without departing from the scope and spirit of the invention, as defined in the following claims.

We claim:

1. A computing system for processing financial instruments using object oriented technology, the system comprising:
   at least one storage device storing:
      a plurality of financial event templates, each financial event template comprising at least one component, and defining, for each variable within said at least one component that points to a different component, a processor-independent interface to the different component, and
      multiple processing objects including at least an event extraction processing object comprising procedures defining processing to be performed for an event type or a plurality of event types; and
   at least one computing device communicating with the storage device, the computing device including a computer processor programmed to execute instructions to perform steps including:
      accessing the plurality of stored financial event templates from the storage device,
      constructing a representation of each financial instrument, the representation comprising a static representation and an event representation of the financial instrument, the construction performed by selecting financial events from the plurality of financial event templates,
      reading at least one of the processing objects from the storage device and reading the event representation of at least one of the financial instruments from the storage device, and
      executing the procedures defined in the processing object that correspond to the financial events of the event representation, wherein the static representation is specified independently from the processing object, wherein the computer processor executes procedures defined in the event extraction processing object, thereby generating the event representation and wherein the event extraction processing object is specified independently of the static representation,
      wherein the static representation further comprises inputs to the financial instrument, the relationships between the inputs, and a manner of integrating the relationships utilizing extraction to generate a series of financial event streams.

2. The system of claim 1, further comprising a set of instrument parameters for the instrument recorded in the storage device.

3. The system of claim 1, wherein the selected processing object acts upon the event representation via a double dispatch mechanism.

4. The system of claim 3, wherein the processing object acts upon the static representation and the instrument parameters via a double dispatch mechanism.

5. The system of claim 1, wherein the processing object acts upon the event representation via polymorphism.

6. The system of claim 1, wherein the multiple processing objects provide an alternate method for performing processing upon the instrument, each processing object being selectable without changing the representation of the instrument.

7. The system of claim 1, wherein the event representation is not persistent and is generated from the static representation.

8. A computer system for processing financial instruments, the system comprising:
   at least one storage device storing:
      a plurality of financial event templates, each financial event template comprising at least one financial event component and defining, for each variable within said at least one financial event component that points to a different financial event component, a processor independent interface to the different financial event component and further providing a processing interface as part of each financial event component,
      at least one processing object comprising procedures adapted to access a representation of the financial instrument through the processing interfaces; and
   at least one computer processor programmed for accessing the storage device and constructing a representation of the financial instruments including a static representation, the programmed computer processor executing instructions for performing steps including:

constructing an instrument specification for the financial instrument by selecting financial event components from said plurality of financial event templates and incorporating the selected financial event components into the static representation, executing the procedures of the at least one processing object upon the financial event components through the processing interfaces, and modifying the static representation from a prior static representation during a lifetime of said financial instrument, by processing the static representation by the same processing objects as the prior static representation, wherein at least one of the processing objects is an event extraction object and the computer processor is further programmed for generating an event representation of the financial instrument as part of the instrument specification, by reading the financial event components comprising the static representation, as instantiated by the parameters, and generating a set of financial events.

9. The system of claim 8, wherein the computer processing components are programmed to further perform steps including reading the event representation of the financial instrument, and performing procedures defined in at least one event processing object that correspond to the financial events of said event representation.

10. The system of claim 8, wherein said processing is performed by executing a method maintained externally to the event extraction object, wherein the processing generates machine-readable data including machine-readable values usable as arguments to invoke the external processing method.

11. The system of claim 8, wherein at least one of the processing objects is a valuation processor.

12. The system of claim 8, wherein at least one of the processing objects determines variables required as specification parameters when processing a specification.

13. The system of claim 8, wherein at least one processing object generates a canonical event structure of the financial instrument from the static representation.

14. The system of claim 8, wherein at least one of the processing objects performs the function of extracting events in a specialized manner for specified valuation processing objects.

15. The system of claim 8, wherein, the static representation is modified from a prior static representation over the lifetime of the financial instrument, and wherein the event representation is processed by the same processing objects as applied to the event representation generated from said original static representation without modifying the event processing objects.

16. The system of claim 8, wherein the computer processor is further programmed for adding a back-office specification and associated parameters to the financial instrument when a trade of the financial instrument is confirmed, the back-office specification and related parameters stating information comprising conditions that impact the financial instrument.

17. The system of claim 8, wherein the computer processor is further programmed for providing default values for variables contained in the static representation.

18. The system of claim 8, wherein the computer processor is programmed for conditionally selecting default values for variables contained in the static representation from one or more sets of default values.

19. The system of claim 18, wherein the sets of default values are international, and the selection is based on user location.

20. The system of claim 8, wherein the computer processor is further programmed for reading the static representation from a relational database, and processing the static representation with the processing object to create a representation of the financial instrument comprising both a static and an event representation thereof.

21. The system of claim 8, further comprising a specification for a static representation of another financial instrument incorporated as an element in the static representation.

\* \* \* \* \*